(12) United States Patent
Kesler et al.

(10) Patent No.: US 11,300,979 B2
(45) Date of Patent: Apr. 12, 2022

(54) SOLAR TRACKING SYSTEM AND METHOD OF OPERATION

(71) Applicant: OMCO Solar, LLC, Phoenix, AZ (US)

(72) Inventors: Matt Kesler, Phoenix, AZ (US); Lepolve Varpilah, Queen Creek, AZ (US)

(73) Assignee: OMCO Solar, LLC, Phoenix, AZ (US)

( * ) Notice: Subject to any disclaimer, the term of this patent is extended or adjusted under 35 U.S.C. 154(b) by 0 days.

(21) Appl. No.: 17/019,796

(22) Filed: Sep. 14, 2020

(65) Prior Publication Data

US 2021/0080980 A1  Mar. 18, 2021

Related U.S. Application Data

(60) Provisional application No. 62/899,958, filed on Sep. 13, 2019.

(51) Int. Cl.
*G05D 3/10* (2006.01)
*H02S 20/32* (2014.01)

(52) U.S. Cl.
CPC ............. *G05D 3/105* (2013.01); *H02S 20/32* (2014.12)

(58) Field of Classification Search
CPC ......... G05D 3/105; H02S 20/32; Y02E 10/50; Y02E 10/47; F24S 2050/25; F24S 30/425; F24S 50/20
See application file for complete search history.

(56) References Cited

U.S. PATENT DOCUMENTS

| | | | |
|---|---|---|---|
| 7,884,308 B1 * | 2/2011 | Mejia | F24S 50/20 250/203.4 |
| 8,939,648 B2 * | 1/2015 | Schneider | F16M 11/18 384/428 |
| 9,281,778 B2 * | 3/2016 | Corio | F24S 25/634 |
| 9,806,669 B2 * | 10/2017 | Michotte De Welle | F24S 30/425 |
| 10,541,644 B2 | 1/2020 | Arliaud et al. | |
| 10,557,646 B1 | 2/2020 | Ma et al. | |
| 10,917,037 B2 * | 2/2021 | Remy | F24S 25/12 |
| 10,944,354 B2 | 3/2021 | Ballentine et al. | |
| 2019/0204405 A1 | 7/2019 | Arliaud et al. | |
| 2020/0309893 A1 | 10/2020 | Arliaud et al. | |

* cited by examiner

*Primary Examiner* — Seung C Sohn
(74) *Attorney, Agent, or Firm* — Tarolli, Sundheim, Covell & Tummino LLP

(57) ABSTRACT

A solar tracking system is provided having a pivoting table driven for rotation about an axis of rotation through a rotational angle range. The pivoting table includes a longitudinally extending beam and a plurality of photovoltaic modules supported by and pivoting with the beam. The system also includes an actuator coupled to the beam for rotating the pivoting table about the axis of rotation through the rotational angle range. A controller is provided for activating the actuator to control rotational angular position of the table.

20 Claims, 17 Drawing Sheets

SOLAR TRACKING SYSTEM AND METHOD OF OPERATION

CROSS REFERENCE TO RELATED APPLICATION

The present application is a non-provisional application that claims priority under 35 U.S.C. § 119 (e) to U.S. Provisional Application Ser. No. 62/899,958 entitled SOLAR TRACKING SYSTEM AND METHOD OF OPERATION that was filed on Sep. 13, 2019 with the United States Patent Office. The present application claims priority to the above-identified provisional application, which is incorporated by reference in its entirety herein for all purposes.

TECHNICAL FIELD

The present disclosure relates to a solar tracking system and method of operation, and more specifically, a solar tracking arrangement of extended length that includes a compensation assembly that optimizes solar absorption.

BACKGROUND

Various types of solar tracker systems are known including a horizontal, single axis solar tracker system. A horizontal, single axis solar tracker system includes a frame for supporting a plurality of photovoltaic modules. The frame includes a torque tube beam and an array of module rails which support the plurality of photovoltaic modules. The torque tube beam is typically comprised of one or more torque tube beam segments affixed in a linear fashion by collars between adjacent segment ends. The torque tube beam may be comprised of a plurality of segments of predetermined length, i.e., 40-foot segments extending up to a few hundred feet in length overall.

The module rails are typically spaced uniformly along the torque tube beam and attached to the torque tube beam via a plurality of brackets. The photovoltaic modules, in turn, are secured to the module rails via a plurality of clamps between adjacent pairs of the rails. An extent of the frame extends in two dimensions, length, generally perpendicular to the path or arc of the sun in the sky, and width, generally in a direction that moves from Southeast to Southwest, tracking the path of the sun. An actuator mechanism, such as a motor, is coupled to the torque tube, beam, or other structural beams (parallel or otherwise) extending in the direction of the length of the tracker, generally north-south to pivot or swing the torque tube beam about an axis of rotation to change an angle of inclination of the frame and thereby adjust the light receiving surfaces of the plurality of photovoltaic modules to track the movement of the sun across the sky so that the photovoltaic modules are maximally exposed to the sun throughout the day. That is, the goal of the solar tracker system is to move or pivot the frame about an axis of rotation such that the light absorbing surfaces of the photovoltaic modules are generally orthogonal to the position of the sun's rays (hereinafter "sun's angle of incidence"), within, of course, the limits of the angle of inclination range of the solar tracking system frame.

In some conventional single axis horizontal solar tracker systems, the torque tube beam extends horizontally along the length of the frame and, to achieve a proper balance, module rails are orthogonal to and centered about the torque tube beam so that a total weight of the frame and the plurality of photovoltaic modules, and associated clamps and brackets/fasteners, is approximately equally distributed on either side of the torque tube beam. A motor is approximately centered along the length of the torque tube beam and includes first and second couplers. A first portion of the torque tube beam is affixed to and extends from the first coupler on one side of the motor and a second portion of the torque tube beam is affixed to and extends from the second coupler on the opposite side of the motor. For example, the first portion of the torque tube beam may extend North from the motor and may be comprised of five forty (40) foot torque tube beam segments, while, the second portion of the torque tube beam may extend south from the motor and may similarly be comprised of five 40-foot torque tube beam segments, thus providing a total North-South extent or length of the torque tube beam of 400 feet. The motor pivots a table of the solar tracker system. The table of the solar tracking system is everything that pivots or swings about the axis of rotation and includes: a) the frame including the torque tube and the module rails; b) the photovoltaic modules; and c) the movable portions of a plurality of solar tracking bearing apparatuses, such as bearings that support the torque tube along its length. The axis of rotation of the solar tracker system extends parallel to the torque tube beam.

The torque tube beam is supported for pivoting movement about the axis of rotation by the plurality of solar tracker bearing apparatuses. Each of the solar tracker bearing apparatuses are affixed to a respective one of a plurality of spaced apart upright support posts which are anchored to or anchored in a substrate, such as the ground. The upright support posts are stationary and support the plurality of solar tracker bearing apparatuses, which, in turn, pivotally support the frame and the plurality of photovoltaic modules. Typically, one solar tracker bearing apparatus is mounted or coupled to each upright support post. Each solar tracker bearing apparatus includes a stationary portion, affixed to a support post, and a rotating portion, which rotates about the axis of rotation. Additionally, the motor is also mounted to its own support post.

The plurality of solar tracker bearing apparatuses pivotally support the torque tube beam for movement or pivoting about the axis of rotation. The actuator/controller mechanism, i.e., the motor, coupled to the torque tube beam provides to motive force to pivot the table about the axis of rotation and thus change the angle of inclination of the table. The plurality of solar tracker bearing apparatuses rotatably disposed between the torque tube beam and the upright support posts permit the torque tube beam to pivot with respect to the upright support posts and thereby allows the angle of inclination of the frame to be changed by the motor such that the plurality of photovoltaic module is maximally exposed to the sun within the range of the angle of inclination of the solar tracking system. The axis of rotation of the table of the solar tracker system is defined by a combination of aligned individual axes of rotation of the individual solar tracker bearing apparatuses. The motor is positioned such that it pivots the torque tube beam about the axis of rotation.

Solar tracker systems are often erected or installed at remote locations where sun exposure is maximized. As such, the solar tracker bearing apparatuses are utilized in outdoor locations, exposed to varying and potentially harsh weather conditions such as high wind conditions. Solar tracking systems are further described in U.S. patent application Ser. No. 16/058,418 entitled SOLAR TRACKER BEARING APPARATUS and is assigned to the applicant/assignee of the present application. The '418 application is attached hereto as an Appendix and incorporated by reference in its entirety.

The information included in this Background section of the specification, including any references cited herein and any description or discussion thereof, is included for technical reference purposes only and is not to be regarded as subject matter by which the scope of the disclosures or claims are to be bound.

SUMMARY

One aspect of the present disclosure includes a solar tracking system having a pivoting table driven for rotation about an axis of rotation through a rotational angle range. The pivoting table includes a longitudinally extending beam and a plurality of photovoltaic modules supported by and pivoting with the beam. The system also includes a motor and gear assembly coupled to the beam for rotating the pivoting table about the axis of rotation through the rotational angle range. A controller is provided for activating the motor and gear assembly to control rotational angular position of the table to at least one first and second prescribed rotations during operation of the solar tracker system, such that the first rotation is at a first location rotated in a first direction beyond a targeted angle of incidence to the pivoting table and the second prescribed rotation is at a second location rotated in a second direction opposite the first direction.

Another aspect of the present disclosure includes a method of controlling an angle of inclination of a pivoting table of a solar tracker system. The method includes the steps of: rotating a table driven about an axis of rotation through a rotational angle range, the pivoting table having a longitudinally extending beam and a plurality of photovoltaic modules supported by and pivoting with the beam; providing a motor and gear assembly coupled to the beam for rotating the pivoting table about the axis of rotation through the rotational angle range; and activating the motor and gear assembly with a controller to control rotational angular position of the table to at least one prescribed overshoot rotation with respect to a targeted position and at least one prescribed angular return rotation with respect to the targeted position during operation of the solar tracker system.

While another aspect of the present disclosure includes a solar tracking system comprising a pivoting table driven for rotation about an axis of rotation through a rotational angle range, the pivoting table including a longitudinally extending beam and a plurality of photovoltaic modules supported by and pivoting with the beam; an actuator coupled to the beam for rotating the pivoting table about the axis of rotation through the rotational angle range; and a controller for activating the actuator to control rotational angular position of the table to at least a prescribed rotation during operation when the controller detects a displaced condition of the solar tracker system to optimize the receipt of the sun's radiation onto the photovoltaic modules, such that the first prescribed rotation is at a first location rotated in a first direction at targeted angle of incidence plus a delta displacement distance.

BRIEF DESCRIPTION OF THE DRAWINGS

The foregoing and other features and advantages of the present invention will become apparent to one skilled in the art to which the present invention relates upon consideration of the following description of the invention with reference to the accompanying drawings, wherein like reference numerals refer to like parts unless described otherwise throughout the drawings and in which.

Figure 1:
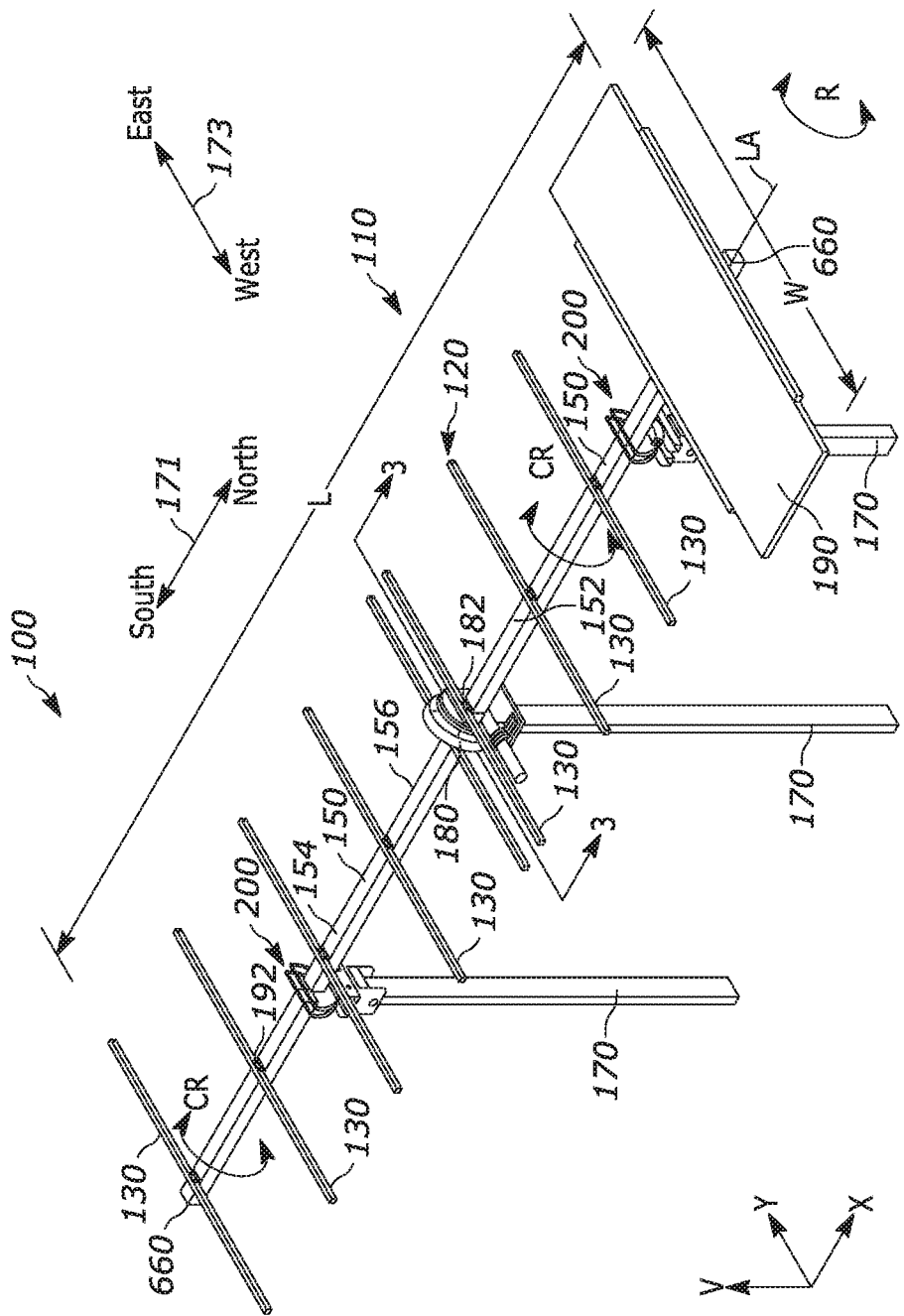
FIG. 1 is a perspective view of a solar tracker system including a plurality constructed in accordance with one example embodiment of the present disclosure.

The figures and application attached hereto as an Appendix is part of the subject application and incorporated herein by reference in its entirety for all purposes.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Referring now to the figures generally wherein like numbered features shown therein refer to like elements throughout unless otherwise noted. The present disclosure relates to a solar tracking system and method of operation, and more specifically a solar tracking arrangement of extended length that includes a compensation assembly that optimizes solar absorption.

Referring now to FIG. 1 is a horizontal single axis solar tracker system 100 that permits and constrains a beam 150 of the tracker system 100 to pivot or swing about a longitudinal axis LA of rotation R. However, it should be appreciated that the current disclosure and embodiments herein could be employed with a two (2) axis trackers and/or azimuth trackers that are typically tilted away from horizontal and that rotate about a vertical axis. A plurality of solar tracker bearing apparatuses 200 are positioned at spaced apart locations along the beam 150 to pivotally support the beam 150.

Advantageously, each of the plurality of solar tracker bearing apparatuses 200 includes a stationary saddle assembly 400 that rotatably supports and defines the axis of rotation R for a rotatable bearing assembly 300. That is, the rotatable bearing assembly 300 is confined to rotate about the axis of rotation R by the saddle assembly 400. In turn, the rotatable bearing assembly 300 supports the beam 150 and constrains the beam 150 to pivot or swing about the axis of rotation R. Thus, the axis of rotation R that the beam 150 is constrained to swing or pivot about is defined by the solar tracker bearing apparatus 200.

The solar tracker system 100 includes components that move or pivot about the axis of rotation R and other components which are stationary. The components of the solar tracker system 100 that pivot about the axis of rotation R are referred to as a table 110 of the solar tracker system and include: a) a frame 120 including the beam 150 and an array or plurality of module rails 130 affixed to the beam 150; b) a plurality of photovoltaic modules 190 (attached by fasteners and/or a track along modular rails 130 (only one shown for clarity)); c) the rotatable bearing assemblies 300 of the plurality of solar tracking bearing apparatuses 200 that support the 150 along its length; and d) associated brackets, clamps, fasteners, etc. that affix the photovoltaic modules 190 to the frame 120 and secure the components of the frame 120 together.

Stationary components of the solar tracker system 100 include: a) a plurality of upright support posts 170 that support the saddles 400 of the solar tracker bearing apparatuses 200; b) the saddles 400 of the plurality of solar tracking bearing apparatuses 200; and c) an actuator/drive/gear assembly 180 that is coupled to beam 150 and provides the motive power for pivoting the beam 150 and the table 110 though an angle of inclination AI. In one example embodiment, the actuator 180 is a motor, a linear (AC or DC) actuator, a mechanical actuator, slew drive, an engine, any combination thereof, or the like coupled to a gear assembly that bisects the beam 150 along its length L at approximately a midpoint and is positioned on a support post 170 such that it drives (through a gear assembly and journals) the beam 150 and the table 110 about the axis of rotation R.

In an alternative example embodiment, the actuator/gear assembly 180 is attached at an end of the beam 150. While in another example embodiment, the system 100 includes a plurality of actuators 180. In another example embodiment, the beam 150 is an I-beam, S-beam, c-channel, tube, box tube, torque tube, any combination thereof, or the like. The beam 150 can be a single beam or multiple beams connected together end-to-end by fasteners and/or welding. In another example embodiment, the beam 150 includes a plurality of horizontal beams that support modules 190, such as two-in-portrait trackers.

The plurality of solar tracker bearing apparatuses 200 are positioned along the beam 150 such that the bearing apparatuses 200 are substantially parallel to but spaced from the longitudinal axis LA of the beam 150. The individual axis of rotation R of each is the plurality of solar tracker bearing apparatuses 200 are thus substantially aligned to or coincident forming a single or combined axis of rotation CR. That is, the axis of rotation R of each of the solar tracker bearing apparatuses 200 are substantially coincident with the common axis of rotation CR of the plurality of solar tracker bearing apparatuses 200. Hence, hereinafter when reference is made to the axis of rotation R of a given solar tracker bearing apparatus 200 it is to be understood that this axis of rotation R is part of and coincident with the combined axis of rotation CR of the plurality of solar tracker bearing apparatuses 200 and plurality of photovoltaic modules or panels 190.

Much of the weight of the table 110 is accounted for by the plurality of photovoltaic modules 190 which are supported by the array or plurality of module rails 130 in a position that is generally vertically above the beam 150. A vertical direction V is shown FIG. 1. As such, a center of mass CM of the table 110 if calculated, will typically be found to be vertically aligned with the longitudinal axis of the beam 150, but positioned vertically above an upper wall 156 of the beam 150, that is, outside of and vertically above the beam 150. Of course, the exact position or location of the center of mass CM of the table 110 will depend on the configuration, and weight of the components comprising the table 110 of the solar tracker system 100.

For proper balance and stability of the table 110 under varying load conditions (i.e., wind and snow loads, etc.), it is advantageous if the axis of rotation R of the plurality of solar tracker bearing apparatuses 200 passes through or passes as close as possible to the center of mass CM of the table 110. Since the axis of rotation R is determined by rotating path of travel of the rotatable bearing assemblies 300 of the plurality of solar tracker bearing apparatuses 200, the toque tube beam 150 which is disposed within a beam slot 306 of the rotatable bearing assemblies 300 is constrained to pivot or swing about the axis of rotation R.

A length L of the table 110 of the solar tracker system 100 is primarily determined by an extent or length of the beam 150. In one exemplary embodiment, the beam 150 is comprised of a plurality of predetermined lengths or segments, i.e., forty (40) foot segments, which are coupled together in an end to end configuration by collars (not shown). For simplicity, in FIG. 1, a shortened, schematic version of the beam 150 is shown. In one exemplary embodiment, the beam 150 includes a first portion 152 and a second portion 154 extending from either side of the motor 180. That is, the actuator/gear drive 180, which rotates the beam 150, bisects or interrupts the beam 150 at or near a longitudinal center along the length L of the beam 150. The first portion 152 of the beam 150 extends from a first journal 182 affixed to one side of a gear assembly 610 (see FIG. 3) that is coupled to the motor 180, while the second portion 154 of the beam 150 extends from a second journal (not shown) affixed to an opposite side of the gear assembly in a similar fashion as the first journal 182 and second portion 153.

As noted above, the schematic representation of the solar tracking system 100 depicted in FIG. 1 includes a relatively short toque tube beam 150. In reality, the length of the beam 150 may include five 40-foot beam segments comprising the first portion 152 of the beam 150 and five 40 foot beam segments comprising the second portion 154 of the beam 150 for a total length of approximately 400 feet and an ability to support over 100 photovoltaic modules 190.

The plurality of module rails 130 are typically oriented in an East-West orientation and the supported photovoltaic modules 190, which may extend beyond the ends of module rails 130, define the width W of the table 110, while the beam 150 is typically oriented in a North-South orientation and defines the length L of the table 110. Each of the plurality of module rails 130 are affixed to the beam 150 by a support bracket 192. The beam 150 extends in a North-South direction 171, while the plurality of module rails 130 extend in an East-West direction 173. In another exemplary embodiment, the beam 150 is substantially square in cross section, having a hollow interior, and is centered about a beam longitudinal axis LA. In one exemplary embodiment the beam 150 is approximately 100 mm. by 100 mm. (approximately 4 in. by 4 in.).

The solar tracker system 100 further includes the plurality of spaced apart aligned upright support posts 170 that are anchored to or anchored in a substrate G (FIG. 2), such as the ground or a roof of a building. To minimize torque load on the posts 170, the posts typically extend upwardly in the vertical direction V, although could extend from the ground or platform at an angle other than ninety (90) degrees. The plurality of upright support posts 170 are aligned along an extent or length of the beam 150 and are spaced apart, typically uniformly, along the length of the beam 150. Mounted to the upper mounting portion 172 of each support post 170 is the solar tracker bearing apparatus 200, which receives and rotatably supports a longitudinally extending portion of the beam 150. As mentioned previously, the solar tracker system 100 further includes the controller mechanism, such as the motor 180, which is coupled to the beam portions 152, 154 and acts to change an angle of inclination AI (FIG. 2) of the table 110 and thereby adjust light receiving surfaces of the plurality of photovoltaic modules 190 to track the movement of the sun across the sky from East to West so that the photovoltaic modules 190 are maximally exposed to the sun to throughout the day, within the limits or the range of the angle of inclination AI as provided by the motor 180 and the configuration of the table 110.

Figure 2:
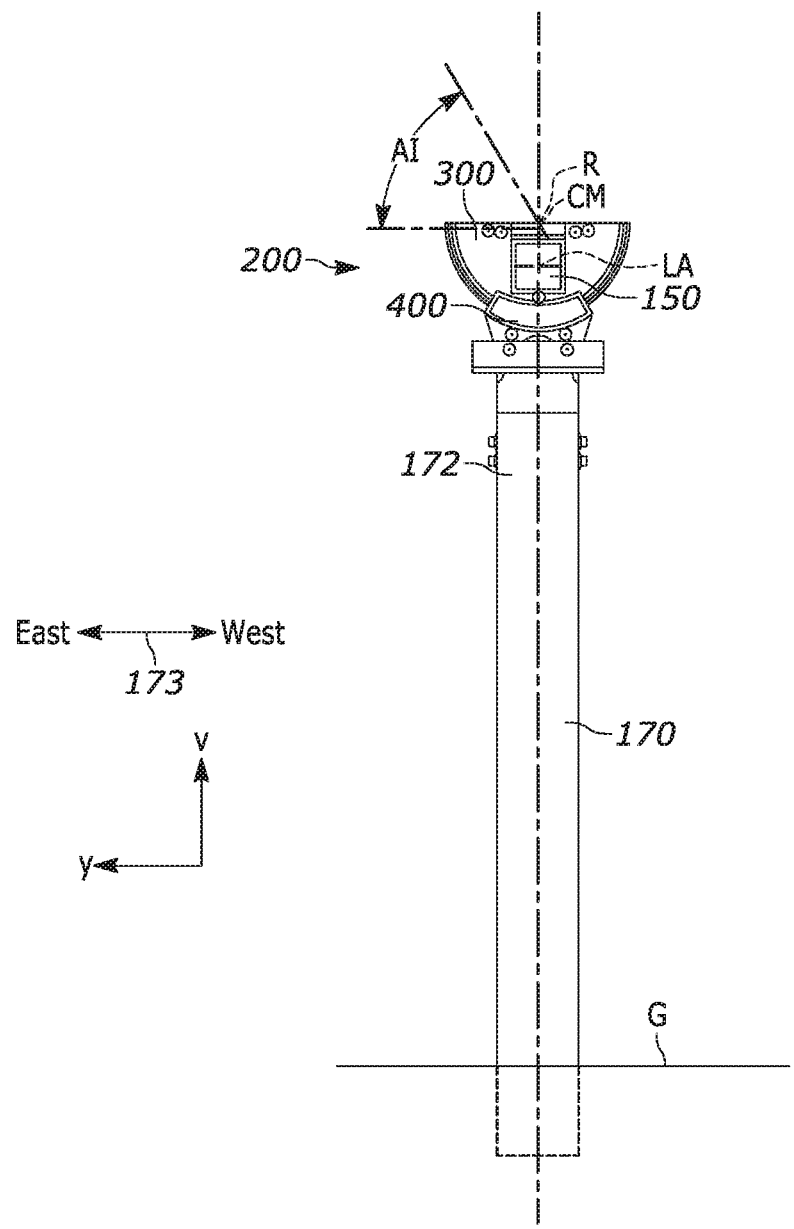
FIG. 2 is a schematic front elevation view of a solar tracker bearing apparatus mounted to the upper mounting portion of a support post constructed in accordance with one example embodiment of the present disclosure.

It should be understood that the angle of inclination AI shown in FIG. 2 represent a maximum rotational or pivotal movement of a rotatable bearing assembly 300 of the solar tracker bearing apparatus 200 about its axis of rotation R in one direction (shown in dashed line in FIG. 2 as a clockwise rotation about the axis of rotation R) with respect to a home position of the rotatable bearing assembly 300 (shown in solid line). The rotatable bearing assembly 300 may also rotate or pivot in an opposite direction, a counterclockwise direction, an angular movement or rotation equal to angle of inclination AI.

Figure 3:
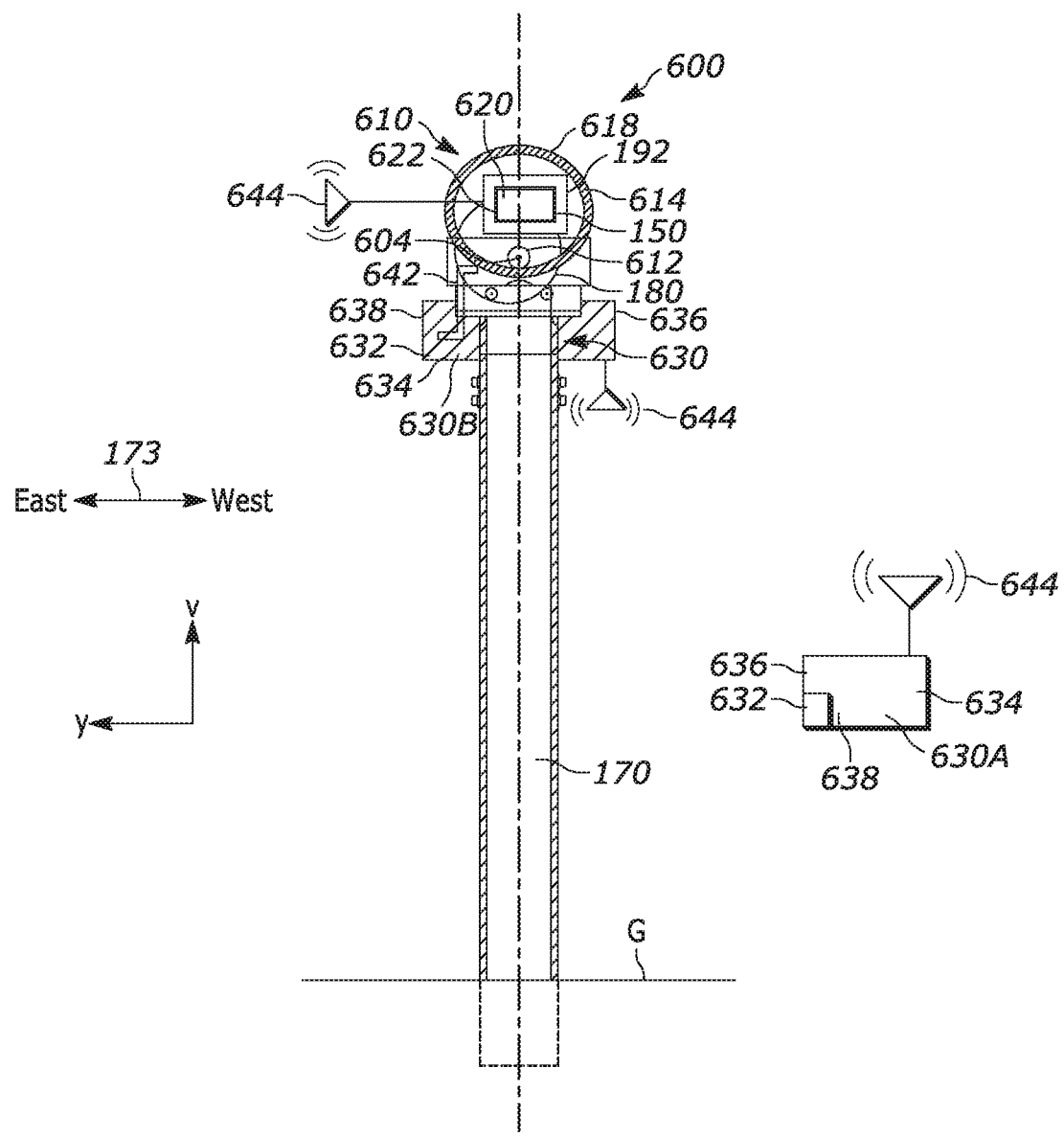
FIG. 3 is a section view of a drive arrangement and mounting post of the solar tracker system in accordance with one example embodiment of the present disclosure along section lines 3-3 of FIG. 1.

As illustrated in the example embodiments of FIGS. 1 and 3, the beam 150 and attached table 110 is driven about the axis of rotation R of the longitudinal axis LA by a drive arrangement 600 that comprises the motor 180 that includes a motor shaft 604 that is coupled to the gear assembly 610 that includes a worm gear 612 and a ring gear 614. Wherein the ring gear 614 is attached to both the first and second portions 152, 154, respectively of the beam 150 via respective support brackets 192. The gear assembly 610 allows the beam to rotate albeit at a different rotational velocity than the motor 180 during operation of the motor through the angle of inclination AI to increments of one-half of one degree, but could be larger or smaller increments as would be appreciated by one of ordinary skill in the art.

It should be appreciated that while the gear assembly 610 of the illustrated example embodiment is a ring 614 and worm 612 gear set, other gear assemblies having differing torque and/or angular velocity requirements could be used, including but not limited to, planetary gear arrangements, piggy-backed spur and bevel gears, ring and pinion gears, slew drive, or any combination thereof as would be appreciated by one of ordinary skill in the art. The drive arrangement 600 is constructed such that the table 110 rotates through the AI in both a clockwise and counter-clockwise manner such that the panels 190 track the sun's concentrated rays or sun's angle of incidence (SAI).

In the illustrated example embodiment of FIGS. 1 and 3, the motor 180 drive axis is oriented East to West and drives the gear assembly 610 has a drive axis-oriented North to South. The gear assembly 610 is then coupled to journals 182 that are in turn coupled to the torque beams 150. The drive assembly 610 rotates the journals 182 about the table's 110 axis of rotation, thus the journals via the drive assembly 610 rotate the torque beams 150.

The gear assembly 610 in the illustrated example embodiment of FIG. 3 is disposed in a housing 618 that covers a portion of the motor 180 and the gearing and may include a lubrication that is stationed in the housing for facilitating the operation of the gears. In the illustrated example embodiment, the beam 150 passes through the housing 618 though an opening 620. The opening 620 of the housing 618 includes a perimetral seal 622 to prevent debris from entering the housing or lubricant from exiting the housing.

In electrical communication with the motor 180 is a controller 630 that comprises a processor 632, having programmable and/or readable memory 634 (ROM/RAM), with input and output 636 interfaces. A controller interface 638 comprising a computer readable medium 640 as used herein refers to a medium or media that participates in providing instructions to the processor/computer 632 for executing instructions on the amount, initiation, and/or duration of power and rotational velocity supplied to the motor 180. In another example embodiment, the computer readable medium 640 is non-transitory software running on a designated and/or remote platforms having separate processing capabilities. While yet in another example embodiment, the controller 630 comprises an application specific integrated circuit (ASIC) in isolation or in combination with the processor 632 and controller interface 638.

As illustrated in FIG. 3, the tracking system or arrangement 100 can include either the controller 630 coupled in direct communication to the motor 180 by a link 642, such as a wired link directly to the motor (to for example provide DC current to drive the motor). The controller 630 is in wired or wireless communication with a remote or network controller 630A, inclinometers (located on the table 110 and/or within hardware of the controller 630 provide feedback to the controller as to the angle of the table) over any number of wireless communication protocols including, but not limited to, the Internet, Wi-Fi, and Bluetooth. In one example embodiment, the inclinometer is located within or is internal to the controller 630.

In yet another example embodiment, the tracker system or arrangement 100 comprises a first controller 630 located and directly coupled to communicate to the motor 180 and a remote or network controller 630A and inclinometer (located along the table 110 and/or wired within the controller) 630B that communicate to the controller 630 to provide power and control to the motor 180. As stated above, the controller 630 is further in communication with one or more inclinometers 630B to provide a feedback loop to the controllers 630 and/or 630A as to the AI of the table 110, thus influencing the amount of rotation by the motor 180. It will thus be appreciated, a computer readable medium 640 is non-transitory and can include multiple discrete media that are operatively connected to the processors 632 of the controllers 630, 630A, for example, via one or more of a local bus or a network connection or wireless connections.

In the illustrated example embodiment, the controller 630 includes an inclinometer 630B and attached thereto positioned along the table 110 and/or wired and connected directly to the controller. In an alternative example embodiment, the inclinometers 630B are attached along the table 110, each providing either wired or wireless feedback looped information to the controllers 630, 630A as to the system's AI.

Also illustrated in the example embodiment, the motor 180 is coupled to the beam 150 through the gear assembly 610 in which the motor 180 is a 24V DC motor, but could equally be an AC motor, stepper motor, and the like without departing from the spirit and scope of the present disclosure. As further illustrated in FIG. 1, the drive arrangement 600 is located at a center of the first and second portions 152, 154, respectively of the beam 150. In one example embodiment, the motor/drive assembly 610 is a slew drive manufactured by KMI Kinematics Manufacturing of Phoenix, Ariz. manufactured under part number HE8C-61MHD-24007RC-DA317. It should be appreciated that the motor 180 can also be located at other positions along the system 100 i.e. asymmetrically, and is contemplated to be within the scope and spirit of the subject disclosure.

Figure 5:
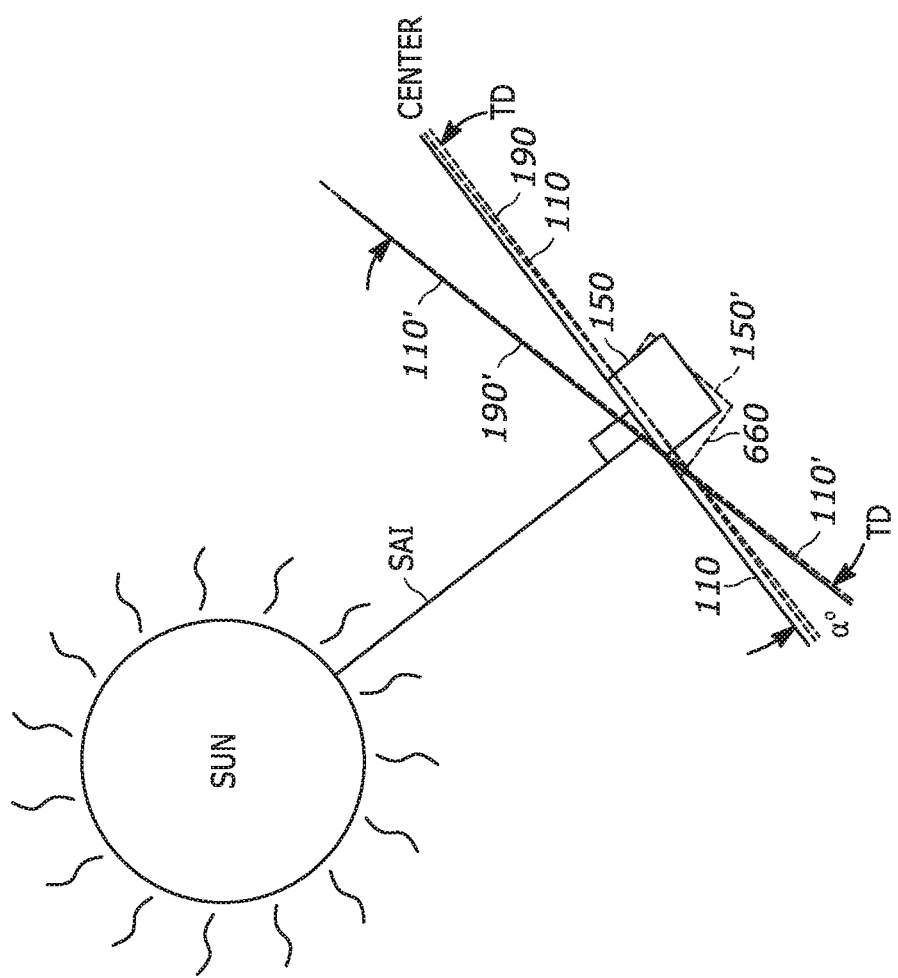
FIG. 5 is an end elevation view of the solar tracker system, illustrating the torsional deformation of the system on extended length systems.

One issue with long beams 150 of approximately 400 feet in total length (approximately 100 feet longer than a typical single-axis tracker) (hereinafter referred to as (extended length)) is that of twisting or torsional deformation that increases over the length of the beam as it is driven by the drive assembly 600. Generally, a twist offset differential between the center location (typically at the motor 180) and far ends 660 of the beams 150 on the order of +/−2° is acceptable. Although to date, there is no government or industry imposed maximum twist or allowable torsional angular deformation standard at least in the United States, the +/−2° has been used within the industry informally in the United States. As the length of the arrangement 100 grows in size, the torsional angular deformation (TD) at the ends 660 increases (as illustrated by angle α in FIG. 5).

Figure 4:
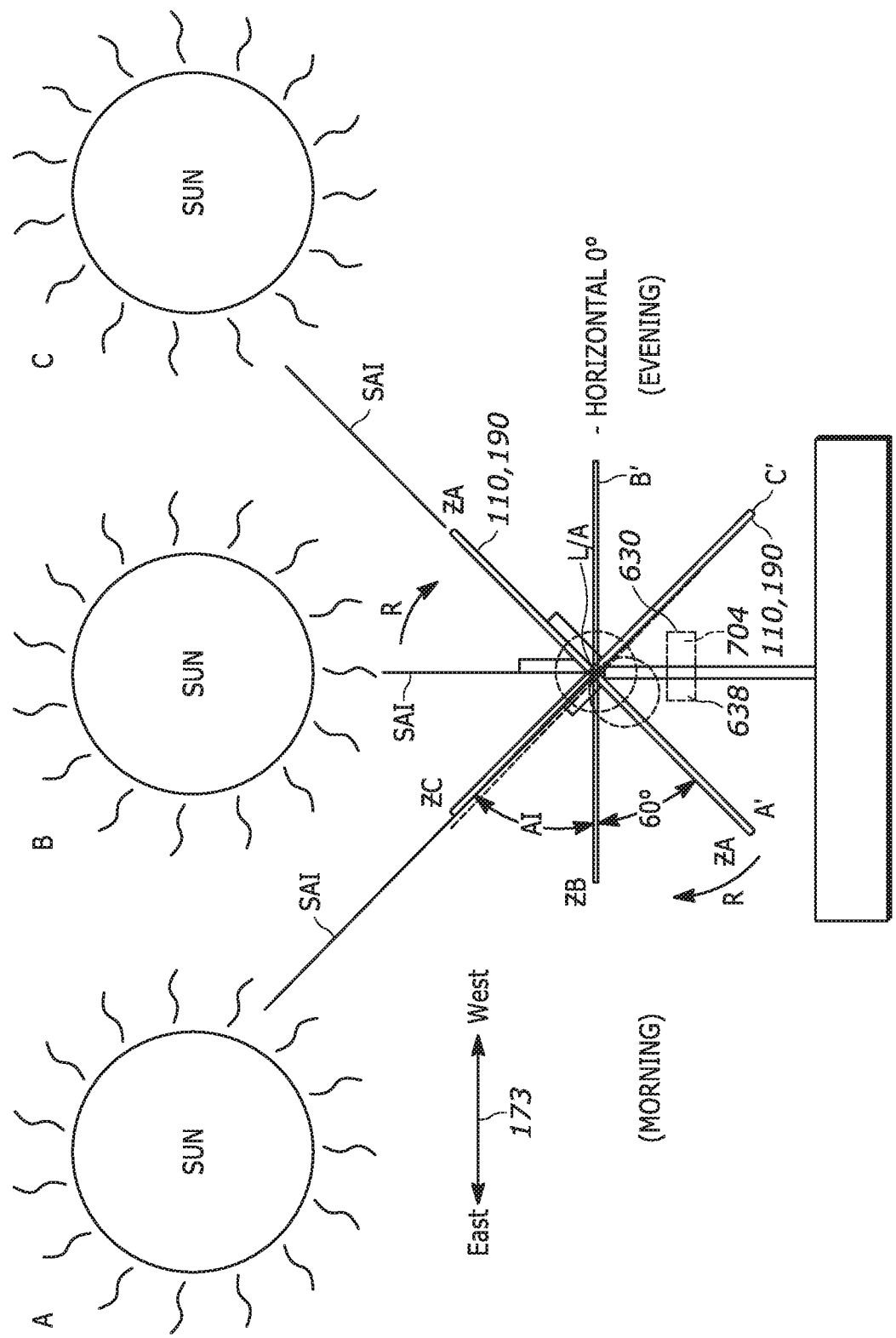
FIG. 4 is a side elevation view of the solar tracker system of FIG. 1, illustrating movement of a table by the drive arrangement throughout its range of operation.

In an ideal operation of the system 100, there is no torsional deformation (TD) and sun's direct rays forming the sun's angle of incidence (SAI) would throughout daylight would be generally normal (orthogonal) to the table 110 and in particular to the photovoltaic modules 190 as the modules rotate by the motor 180 as the Earth orbits the sun, the table will see the sun as it moves from the East to West direction (as illustrated in FIG. 4). That is, as the Earth rotates from positions A, B, and C, throughout the day, seeing the sun from East to West, the motor 180 is driven by the controller 630 to track the SAI such that the SAI is generally always normal throughout the day to all panels 190, which rotate as shown by the rotation R indicated by corresponding panel positions A', B' and C', rotating the table 110 through the entire angle of inclination path. Such tracking of the sun such that the SAI is always normal to the table 110 (as illustrated in FIG. 4) maximizes the power generated by the modules throughout the day. In conventional systems, the U.S. Naval Observatory provides a sun path algorithm such that the motors and controllers can be programmed within less than 1/10 of one degree of the SAI.

As the systems 100 become longer, an extended length in excess of 200 even up to 400 feet, TD increases significantly along the longitudinal axis LA away from the center toward the ends 660. Depending on the cross-sectional geometry and modulus of elasticity of the tube beams 150, the TD can be deformed several degrees relative to the center as indicated by the angle α in FIG. 5. As such, the SAI is incapable of being within +/−2° with the modules 190 along the entire table 110 over these extended length systems 100 ranging in their entirety from 300-500 feet.

In a conventional system, the tables move one-half of one degree or one degree on average (step) at a time as the sun is being tracked. Such movement of the conventional system is such that it always moved one-half of the motion or step beyond the SAI of the sun. For example, if the conventional system was programmed to rotate the table in one-degree increments or steps, it would continue to move one-half of the step or one-half of one degree beyond the SAI of the sun. The sun then moves one degree, leading the table by one-half of one degree before the conventional table increments the one degree in the example presented.

The system 100 advantageously includes a compensation target system 700 to compensate for the twisting and TD over these extended lengths so as to increase and optimize the power generation of the photovoltaic modules 190 along the entire table 110. Stated another way, the system 100 compensates overshoot of the table 110 from the target point and returning the table back to make the tracker straighter and more accurate.

Figure 6:
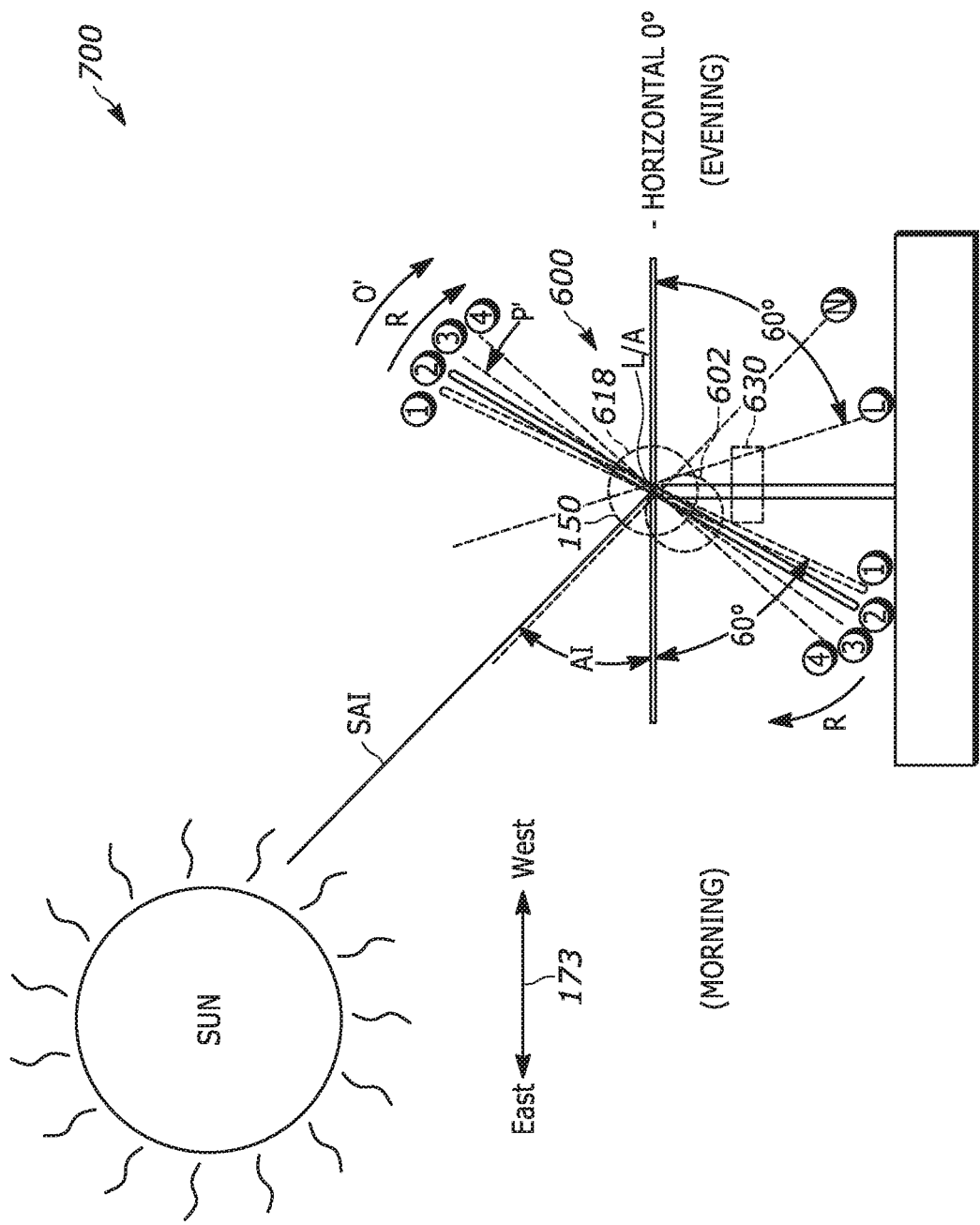
FIG. 6 illustrates the various positions of the system and particularly the table relative to the sun's angle of incidence.

The compensation target system 700 illustrated in FIG. 6 in one example embodiment uses the motor 180 and controller 630 to allow the angle of inclination of the table 110 to over-travel the sun's angle of incidence that would be normal (orthogonal) to the panels for a given position of the sun. The over-travel or overshoot O' extends to an angle greater than ninety degrees (90°) then reversing the motor 180 through the controller 630 to a return position P' to align with a desired angle of inclination such that the SAI is substantially orthogonal to the panels. This compensation target system 700 this has the effect of getting the ends 660 closer to the desired angle of inclination, thus increasing power generation over the entire length of the table 110.

Employing the compensation system 700 as described above to a particular example, the controller 630 instructs the motor 180 to move in one (1) degree steps or increments. The controller 630 activating the compensation system 700 then instructs the motor 180 to overshoot O' an additional two (2) degrees and instructing the motor to reverse directions to a return position P' one (1) degree. The system 100 then waits for the sun's SAI to travel one-half of one degree ahead of the table 100 based on timing from a look up table 704 before restarting the process. That is, the one (1) step or increment occurs based on instructions from the controller 630 plus the effect of the compensation system that is an additional two (2) degrees for the overshoot O' at which time a total distance rotated is three (3) degree West. At this point the system is immediately reversed one (1) degree to the return position P'.

In another example embodiment, the compensation target system 700 illustrated in FIG. 6 employs the motor 180 and controller 630 to allow the angle of inclination of the table 110 to over-travel or overshoot the sun's angle of incidence that would be normal (orthogonal) to the panels for a given position of the sun to an angle greater than ninety degrees (90°). After overshoot O' occurs, then reversing of the motor 180 through the controller 630 to the desired angle of inclination such that the SAI is within a few degrees of being orthogonal to the panels that are within one-hundred feet of the motor.

For example, photovoltaic panel 190 is rotating in a clockwise direction R from position 1 to track the SAI and would in a conventional system stop at position 2 where the SAI is orthogonal to the panel 190. But because of the extended length of the system 100, the compensation targeting system 700 instructs the controller 630 to rotate the table 110 such that the panel 190 over-travels the SAI 90° position 2 and continues to rotate to over extended position 4 before stopping. At which time, the controller 630 instructs the motor 180 to reverse direction such that the table and attached panels now rotate in a counter-clockwise direction to stationary power position 3 (which is over the 90° location of position 2). This compensation target system 700 this has the effect of getting the ends 660 closer to the desired angle of inclination, thus increasing power generation over the entire length of the table 110 when compared with instructing the controller to track the SAI 90° position 2 for the entire table and path of AI travel.

In another example embodiment, the targeting or compensation system 700, the amount or angular overshoot (see O' in FIG. 6 to position 4) and angular return (see P' in FIG. 6 to position 3) is dependent on the angle of inclination position as the table pivots through the total angle of inclination range or path A'-C' illustrated in FIG. 4 such that the amount of overshoot O' and angular return P' vary based on the relative position of the angle of inclination of the table 110. In particular, the controller 630 uses the controller interface 638 to produce a number of discrete zones in which the overshoot O' and the angular return P' vary based on the relative position or zone in which the table is currently operating.

In an exemplary embodiment, the controller 630 includes an encoder or inclinometer 602 coupled to the motor 630 to detect the relative angle of inclination AI of the table 110, thereby knowing an assigned zone, for example ZA, ZB, and ZC (see FIG. 4) and employing a look-up table 704/1013 in the controller 630 and/or controller interface 638 such that each zone has an assigned angular return P' and overshoot O' value. While only three different zones are illustrated ZA, ZB, and ZC, it should be appreciated that the number of zones within the table's 110 inclination path could be unlimited.

In one example embodiment, the zones ZA, ZB, ZC . . . nZn are stored in a lookup table 704/1013 within the controller 630, 630A in memory 634 or the like. The prescribed zones ZA, ZB . . . are based on both the angle of the table 110 or system 100 and the direction of the system's motion. For example, ZAE1, ZAE2, . . . ZAEn are zone positions as the system 100 moves from East to West, each zone having an assigned overshoot O' and return position P'. While zones ZAW1, ZAW2, . . . ZAWn are zone positions as the system 100 moves from West to East. In another example embodiment, the system 100 only moves from East to West during normal daily tracking of the SAI to the AI, and the system only moves West to East early in the morning when the system 100 is waking up to travel to its furthest East zone or position.

The target or compensation system 700 of the above embodiments has the effect of getting the ends 660 closer to the desired angle of inclination and within the +/−2°. In one example embodiment, the power to photovoltaic modules along the entire system 100 is maximized for one or all zones when the overshoot O' is one (1°) degrees beyond the SAI and the angular return P' is one half of one degree (½°) beyond the SAI.

In yet another example embodiment, the arrangement 100 activates the target system 700 by executing instructions provided by the controller interface 638 by non-transitory computer readable medium either internal to the processor 632, in memory 634, or from an external source provided to an input interface 638 of the controller. While in another example embodiment, the controller 630 includes a computer system 710 that communicates and receives operation instructions from the Internet, a network such as a LAN, WAN, and/or a cloud, input/output devices such as flash drives, remote devices such as inclinometers or manometers, and displays such as a monitor, or any combination thereof.

Figure 7:
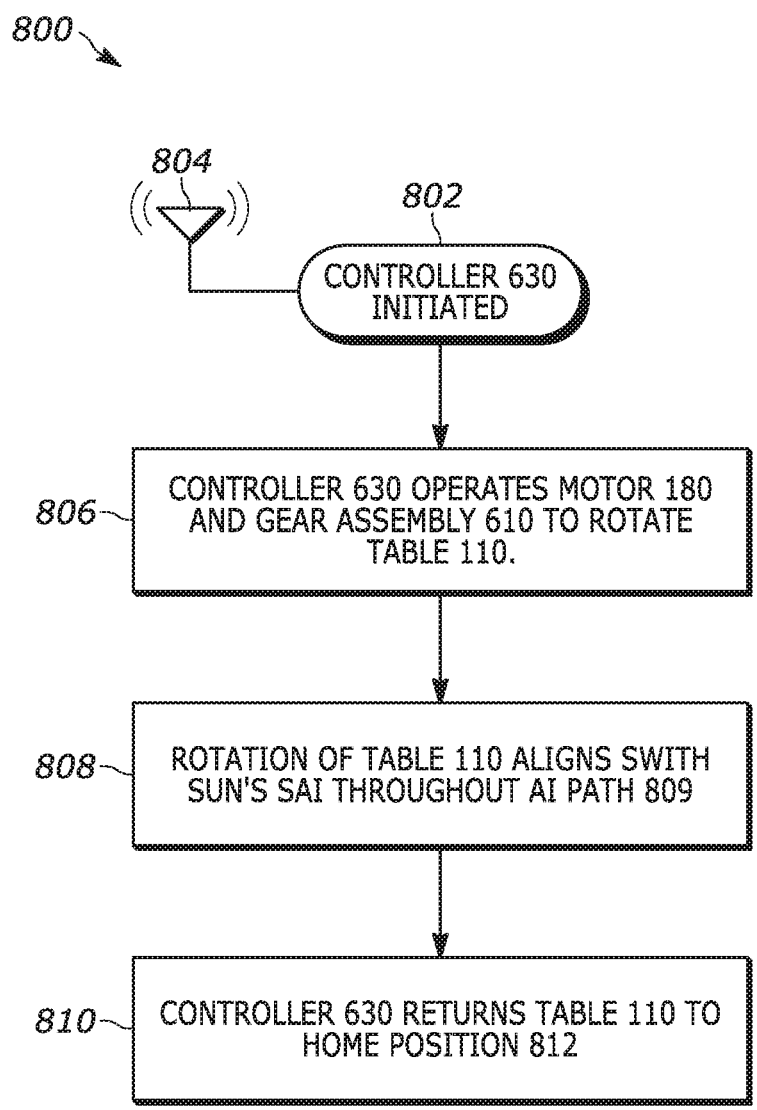
FIG. 7 is a flow chart illustrating the operation of the system in accordance with one example embodiment of the present disclosure.

Illustrated in FIG. 7 is a flow chart depicting a process of operation 800 of the system 100 in accordance with one example embodiment. The process 800 initiates the controller 630 at 802 based on a timer or clock built into the processor 632, remote signal 804, or by instructions from computer readable medium 640 from the controller interface 638, as the sun starts to rise in East. The signal 804 or computer readable medium 640 in one example embodiment are tracking coordinates from the U.S. Naval Observatory or a third party as to the angle of inclination AI needed at a particular latitude and longitude setting of the system 100 such that the table 110 AI can (either continuously or incrementally) rotate and track the sun's SAI so that the SAI is normal, i.e. orthogonal to the photovoltaic panels 190 throughout the table's AI path of travel 809 during sun light hours (as if there was no TD). At 806 the table 110 is rotated based on instructions from the controller 630 such that the photovoltaic modules 190 are orthogonal to the sun's SAI. At 808, the process 800 continues such that rotation of the table 110 by the motor/controller and gear assembly such that the table aligns with the sun's SAI throughout the AI path 809. At 810, the process 800 employs the controller 630 to return the table 110 to a home position 812 for the start of a new cycle when the sun rises again from the East. The home position 812 could include travel of the table 110 known as "Back Tracking" sixty degrees (60) from horizontal shown in FIG. 4 to the morning position. Alternatively, the table 110 could include travel to the home position 812 after an extended delay in the evening position, for example overnight. Or, the travel of the table 110 could be such that there is no Back Tracking such that shadowing of parallel systems and particularly panels 190 are not obscured by the adjacent system.

Stated another way, Back Tracking is used to ensure that the modules 190 mounted on the one tracker systems 100/700 do not shade modules mounted on an adjacent system 100/700. Back Tracking is employed in the morning and in the late afternoon, when positioning the modules 190 normally to the incident sunlight would cause such shading. Even a small amount of such shading can reduce energy production by a significant amount, because the solar cells within each module 190 are smaller in area than the whole module; for example, each cell may be 150 mm×150 mm or 150 mm×75 mm, while the whole area of the module may be 1,000 mm×2,000 mm. In addition, the cells are typically connected to each other in series, so that shading even one cell by a given fractional amount will reduce the energy production of the whole module 190 by that fractional amount.

As an example, ten percent (10%) of the area of one cell is shaded, the energy production of the whole module 190 may be reduced by approximately ten percent. Thus, it is very undesirable to allow the modules 190 mounted on one system 100/700 to shade the modules mounted on an adjacent system by even a small amount. Back Tracking eliminates this shading by moving the modules 190 away from an angle normal to the incident sunlight, toward a more nearly horizontal angle which has been calculated to avoid such shading at that time. During Back Tracking, the optimum angle OA of the modules is not the angle normal to the incident sunlight, but the angle most nearly normal to the incident sunlight which does not allow any shading by the modules mounted on one tracker or system on the modules mounted on an adjacent tracker/system. It is still important to move the system 100/700 in such a way as to position all the modules at the optimum angle OA, and using the Back Tracking method during shading of adjacent systems described above improves the ability of the tracker/systems 100/700 to achieve that objective.

In another example embodiment, the system 100 includes a snow removal arrangement in which the table 110 contains a noticeable amount of precipitation, such as snow or ice, such that the amount of power generated is reduce, signaling the system 100. In such conditions, the controller 630 activates the motor 180 to rotate the table 110 to extreme positions to knock-off the snow or ice. For example, the precipitation is detected by photographic images, reduction in power, sensors (such as barometers in communication with the controller 630 or any combination thereof. The controller 630 activates the motor 180 to rotate the table 110 from sixty (60) degrees below horizontal (see FIG. 4) to sixty (60) degrees over horizontal and back to the home position 812, one or multiple cycles in a relatively short period of time, such as one-minute cycles to eliminate the collection of precipitation on the modules 190.

Figure 8A:
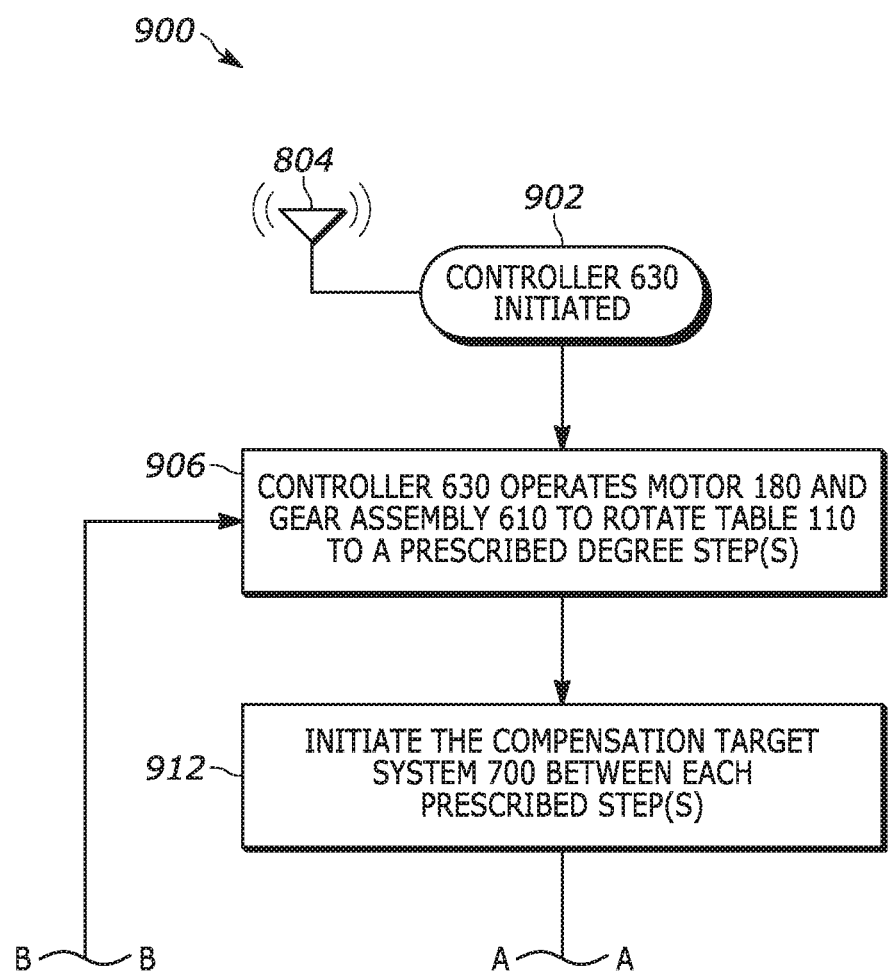
FIGS. 8A-8B is a flow chart illustrating the operation of the system in accordance with another example embodiment of the present disclosure.
Figure 8B:
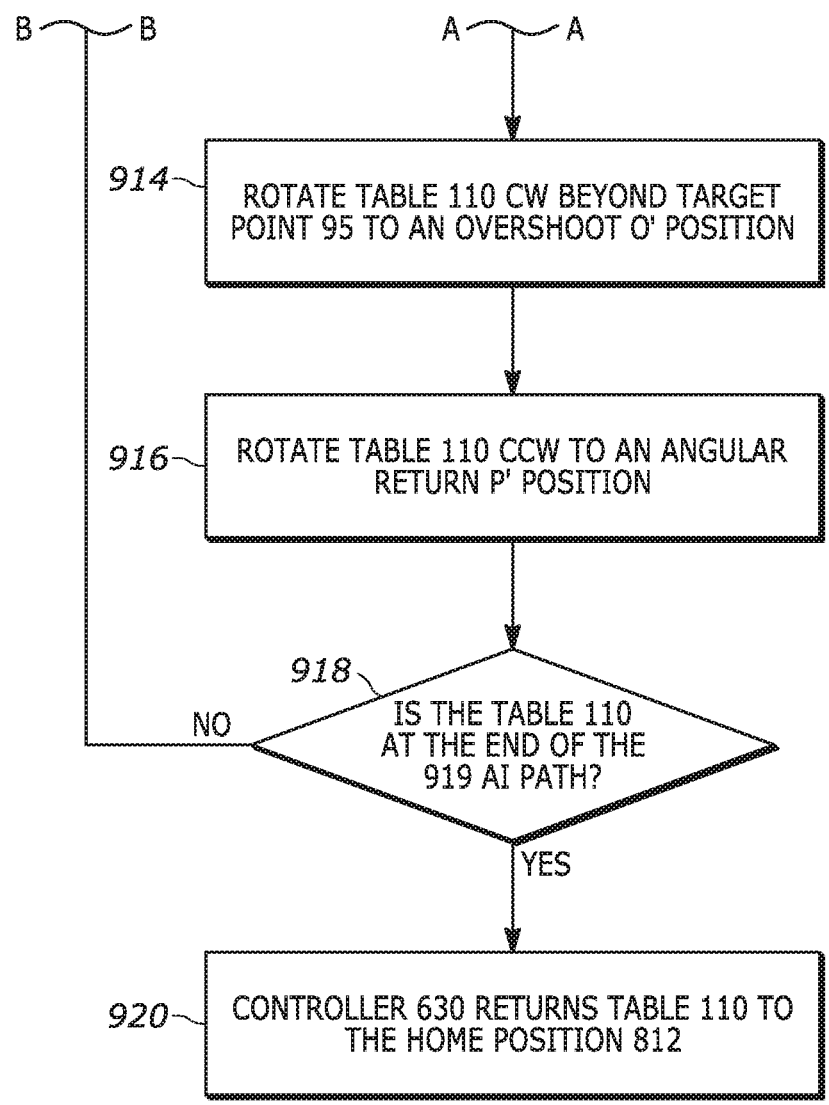

Illustrated in FIGS. 8A and 8B is a flow chart depicting a process of operation 900 of the system 100 in accordance with another example embodiment. The process 900 initiates the controller 630 at 902 based on a timer or clock built into the processor 632, remote signal 804, or by instructions from computer readable medium 640 from the controller interface 638, as the sun starts to rise from the East. The signal 804 or computer readable medium 640 in one example embodiment are tracking coordinates from the U.S. Naval Observatory or a third party as to the angle of inclination AI needed at a particular latitude and longitude setting of the system 100 such that the table 110 AI can rotate incrementally and track the sun's SAI so that the SAI is normal, i.e. orthogonal to the photovoltaic panels 190 to multiple target point(s) 950 see FIG. 6 throughout the table's AI path of travel 809 (see FIG. 4). At 906, the table 110 is incrementally rotated based on instructions to a prescribed step (S) from the controller 630 such that the photovoltaic modules 190 are orthogonal to the sun's SAI (as if there was no TD). The process 900 continues to 912 and initiates the target system 700 between the prescribed or incremental step S.

At 914, the process 900 continues as the table 110 is rotated clockwise beyond the target point 950 to a prescribed overshoot position O'. At 916, the process 900 continues as the table 110 is rotated from the overshoot position O' counter-clockwise to a prescribed angular return position P'. In one example embodiment, the return position P' can be equal to, greater than, or less than the target point. At 918 the process 900 continues in which a determination is made as to whether the table 110 is at a prescribed end of the AI path 919. If the determination 918 is in the negative, the process 900 returns to operation 906 in which the table 110 rotates the table 110 to the next prescribed degree step S (typically based on timing or clock speed) and the process 900 continues. If the determination 918 is in the affirmative, the process 900 continues at 920 in which the controller 630 returns the table 110 to the home position 812.

In one example embodiment, the activation of the controller 630 to control the angular position of the table 110 to control the rotational angular position of the table to rotate the table to a first prescribed position beyond a targeted angle of incidence in a first direction (either CW or CCW) and then rotating the table to a second prescribed position (the opposite the rotation of the first direction either CW or CCW) (as illustrated in FIG. 8B) occurs with each movement of the table, including returning to a home position, stowing position, normal tracking state, night state, and backtracking state. In an alternative example embodiment, the controller 630 overshoot and return as described in the previous sentence occurs only at one or any combination of states listed above. For example, the overshoot and return only occurs during sun tracking, or overshoot and return occurs only at sun tracking and the stow or storage state.

Figure 9A:
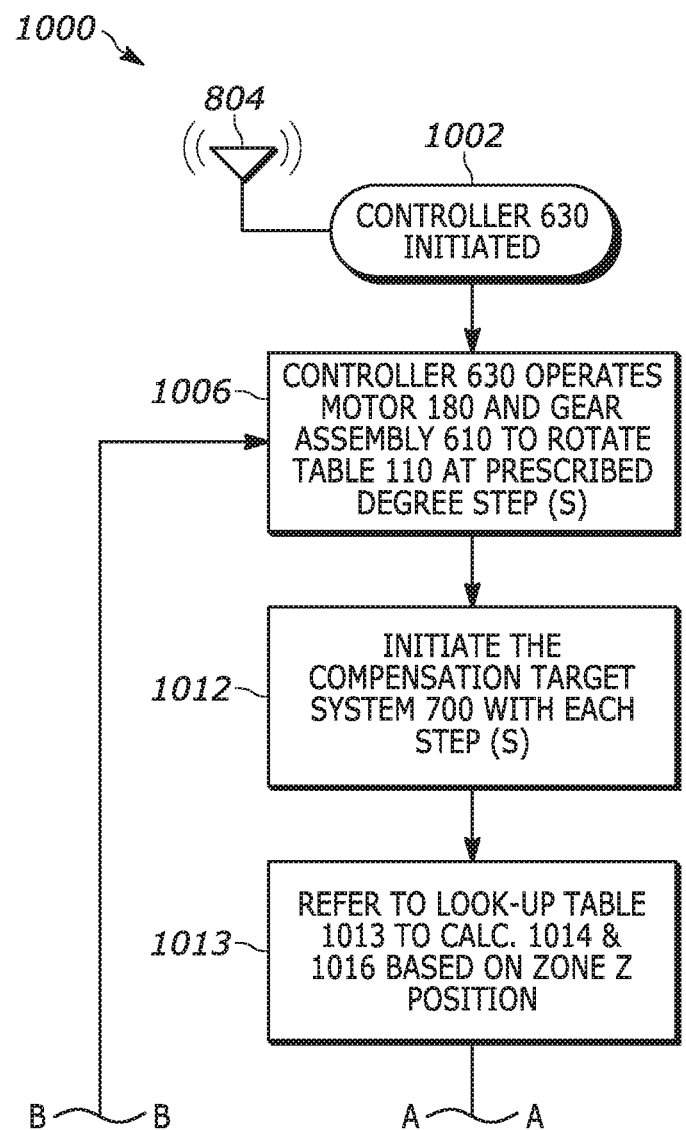
FIGS. 9A-9B is a flow chart illustrating the operation of the system in accordance with another example embodiment of the present disclosure.
Figure 9B:
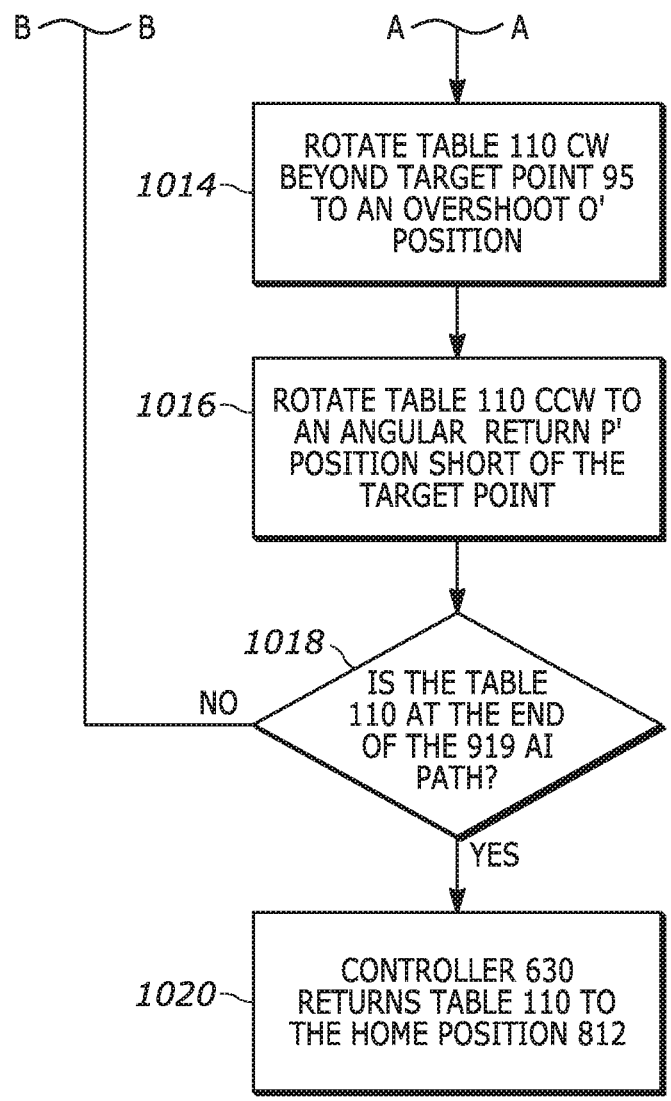

Illustrated in FIGS. 9A and 9B is a flow chart depicting a process of operation 1000 of the system 100 in accordance with another example embodiment. The process 1000 initiates the controller 630 at 1002 based on a timer or clock built into the processor 632, remote signal 804, or by instructions from computer readable medium 640 from the controller interface 638, as the sun starts to rise from the East. The signal 804 or computer readable medium 640 in one example embodiment are tracking coordinates from the U.S. Naval Observatory or a third party as to the angle of inclination AI needed at a particular latitude and longitude setting of the system 100 such that the table 110 AI can rotate incrementally by steps S that would track the sun's SAI so that the SAI if following the steps would be substantially normal, i.e. orthogonal to the photovoltaic panels 190 to multiple target point(s) 950 see FIG. 6 throughout the table's AI path of travel 809 (see FIG. 4).

At 1006 the table 110 is incrementally rotated based on instructions from the controller 630 such that the photovoltaic modules 190 are orthogonal to the sun's SAI (as if there was no TD). At 1012, the process 1000 continues such that the compensation target system 700 is initiated with each step S.

In the illustrated example embodiment of the process 1000 of FIGS. 9A and 9B, the target system 700 additionally reads an encoder, inclinometer, or similar devices to determine the angular rotation of the tube beam 150 and based on the angular rotation value refers to a look-up table at 1013 (for example in memory 634 of the controller 630) to see what prescribed zone $Z_n$ the table 110 AI is and what prescribed overshoot O' angular rotation value to apply at step 1014 and what prescribed return position P' angular rotation value to apply at step 1016 of the process 1000.

At 1018 the process 1000 continues in which a determination is made as to whether the table 110 is at a prescribed end of the AI path 919. If the determination 1018 is in the negative, the process 1000 returns to operation 1006 in which the table 110 rotates prescribed step S to follow the sun's SAI throughout the AI path 809. If the determination 1018 is in the affirmative, the process 1000 continues at 1020 in which the controller 630 returns the table 110 to the home position 812.

In one example embodiment, the home position 812 can be any position in which the table 110 is at rest and/or the system 100 is recalibrated for the next day/sun cycle. For example, in the illustrated example embodiment of FIG. 4, the home position 812 is at point A'. In an alternative example embodiment, the home position 812 in FIG. 4 is at C', resting overnight until the sun rises or just before, the table/modules 190 return to position A'. In yet another example embodiment, the home position 812 is anywhere along the path from A' to C'. Further the home position 812 can be set before a snow dump or wind stow and returned to home 812, or alternatively, the home position is obtained subsequent to a wind stow and/or snow dump.

In yet another example embodiment, there is an unlimited number of zones $Z_n$ throughout the AI path 809 of travel, the values assigned to overshoot O' and/or return position P' in the lookup table 704/1013 can be increased or decreased based on weather conditions. For example, if snow or ice built up on the table 110 more overshoot O' and/or less return position P' may be needed and is built into the process 1000. Such amplifications or reductions in the values O' and P' can be prescribed into the memory of the lookup table 1013 or adjusted in real time based on a signal from a transceiver on an inclinometer and/or precipitation gauge.

In another example embodiment, there is an unlimited number of zones $Z_n$ throughout the AI path 809 of travel, the values assigned to overshoot O' and/or return position P' in the lookup table 704/1013 can be increased or decreased based on the current orientation of the table 110. For example, when the table is nearly horizontal (see ZB in FIG. 4), it may only require one degree of overshoot O', but when it is at 60 degrees from horizontal (see ZA in FIG. 4) it may require two degrees. The values for the overshoot O' and return positions P' are also a function of the balance of the table 110, length of the system 100, and which direction the table is being rotated.

While in another example embodiment, the infinite number of zones $Z_n$ throughout the AI path 809 of travel, the values assigned to overshoot O' and/or return position P' can be increased or decreased based on the orientation of the table 110 travel. For example, if the table is rotating in an upward direction to horizontal (see FIG. 4) more overshoot O' and/or less return position P' may be needed opposed to when the table 110 is rotating downward beyond the horizontal position and is built into the process 1000.

In the above-described embodiments, the target system 700 the target points 950 are calculated as if the sun's angle of incidence SAI was engaging the entire system 100 without any torsional deformation. Moreover, when the overshoot O' and return position P' values and positions are implemented, no part of the system 100 in one example embodiment receives the SAI at a normally or orthogonally (perfect alignment with the target point 950) because the beams 150 overshoot O' the target point 950 and optionally employ an angular return position P' that is still beyond the target point. Stated another way, the angular value of rotation of the overshoot O' is greater than the return position P', i.e. O'>P'.

In an exemplary embodiment, the system 100 initiates the target or compensation system 700 such that the controller identifies in the lookup table 1013 that the target point 950 is forty-five degrees. Accordingly, the controller activates the motor 180 and gear assembly 600 to rotate the table 110 to the target point at forty-five degrees plus an additional one (1) degree of overshoot O' from a value found on the lookup table 1013 for the prescribed zone and an angular return position P' value of negative one-half of one (−½) degree. Implementing this exemplary embodiment, the final position of the entire system is at least one half of one (½) degree (45.5°) over the SAI value of forty-five degrees. The angular difference is even greater at the ends 660 because of the torsional deflection and could be a value of 44.5 degrees, making the whole system 100 within one-half of one degree of the target value.

It has been found by testing such system the overall system has a greater power generation with the overshoot O' followed by an angular return position P' that is greater than the target position 950 for systems of significant or extended length, i.e. over three hundred feet (300'). Such system 100 in its extended length and target systems 700 eliminates the need and cost associated with more systems, motors etc. because comparable power can be generated over greater lengths of the system with a single motor 180 and gear assembly 600.

Figure 10:
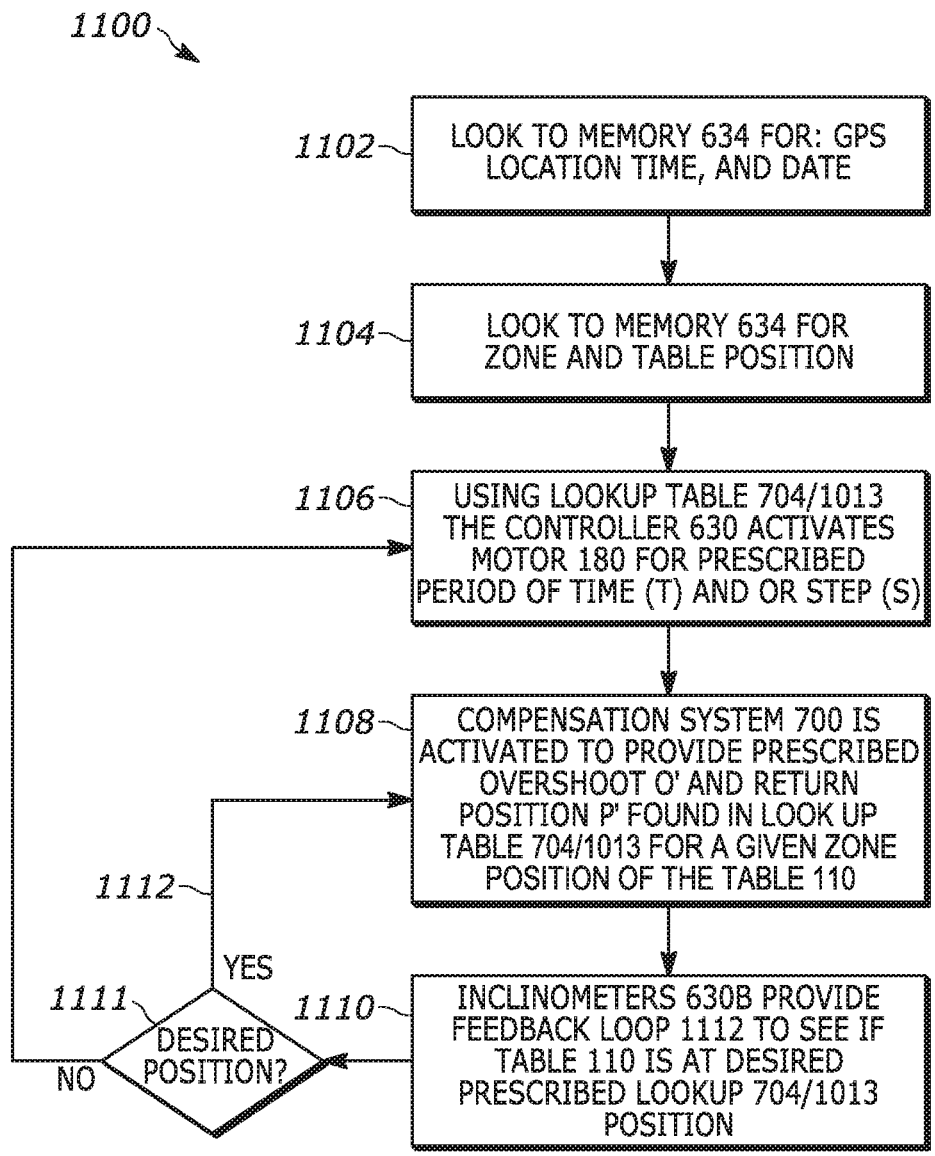
FIG. 10 is a flow chart illustrating the operation of the system in accordance with another example embodiment of the present disclosure.

During operation in one example embodiment, the system 100 initiates a process 1100 (as illustrated in FIG. 10) at 1102, utilizing its controller 630/630A and internal processor 632 that has stored in memory 634 the latitude and longitude of the system as well tracks (through an internal clock in the processor) the date and time. The controller 630/630A further tracks the current position and zone of the table 110 at 1104. Using the internal clock in the processor 632, a lookup table 704/1013 in the controller 630/630A the controller activates the motor 180 for a prescribed period of time (T) to perform a prescribed degree or incremental amount degrees or steps S that could vary from respective zone locations to rotate the motor. The inclinometers 630B internal to the controller 630 or on the table 110 provide feedback 1112 to the controller, instructing the controller when to halt motor and system rotation when a desired angle has been achieved at 1110. At this point, processes 800-1000 are employed. Advantageously, the systems 800-1000 provide an increase in power capture by the table 110, because the overshoot O' and return positions P' mitigate and compensate for the lag or TD from the center of the system 100 to the ends 660 of the torque beams 150 for extended systems.

In one example embodiment, the system's rotation of a table 110 occurs approximately every two minutes and the rotation is approximately one-half of one degree or about every four minutes, the system rotates a full degree. The sun can pass over the system 100 by half the size increments above, that is one-quarter or one half of one degree, respectively before initiating the rotation by the controller 630/630A, thus rotation by the system.

Figure 11:
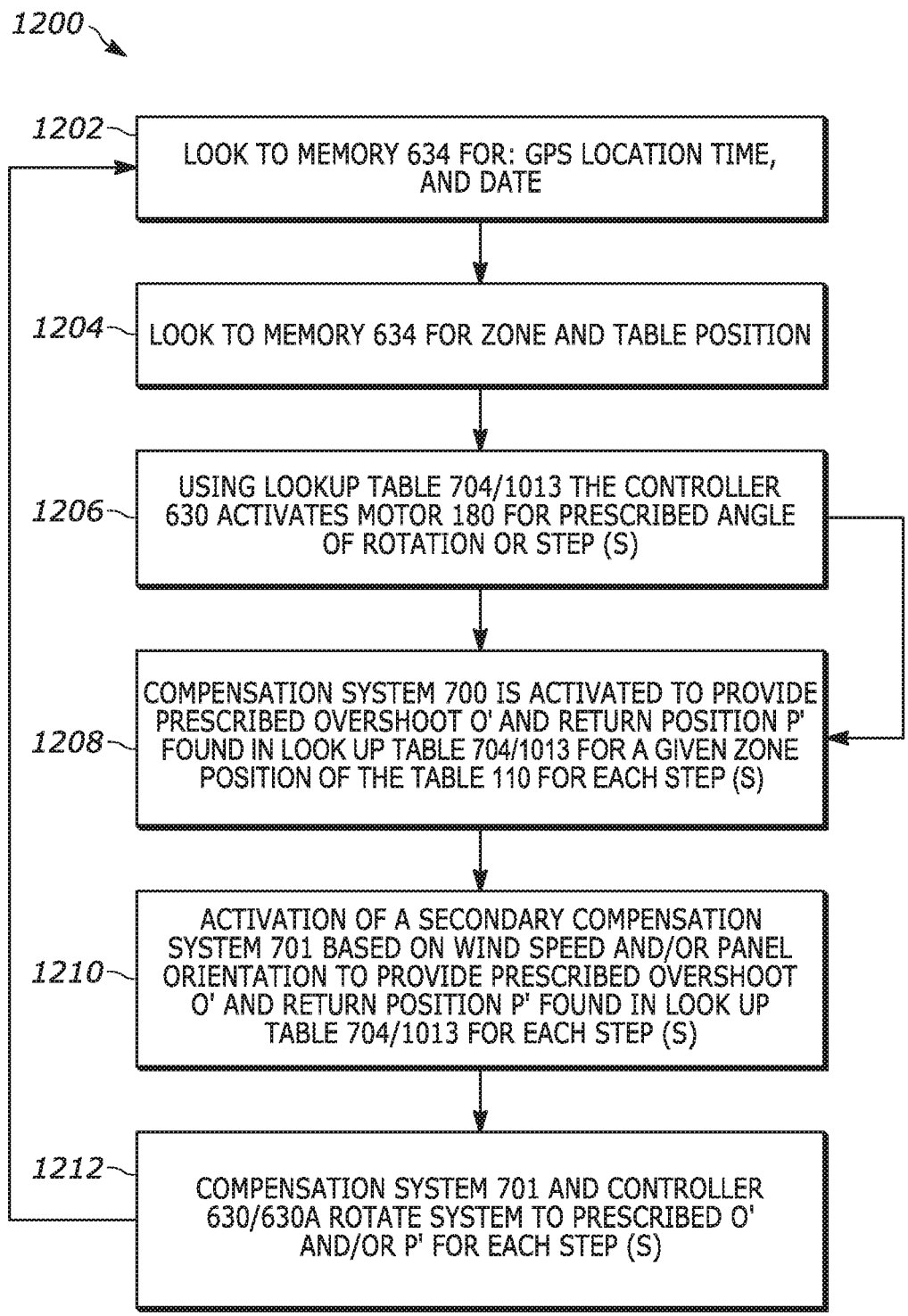
FIG. 11 is a flow chart illustrating the operation of the system in accordance with another example embodiment of the present disclosure.

Referring now to the process 1200 in the example embodiment of FIG. 11, the system 100 initiates a process 1200. At 1202, the controller 630/630A and internal processor 632 that has stored in memory 634 as to the system's latitude and longitude as well tracks (through an internal clock in the processor) the date and time. At 1204, the process 1200 continues with the controller 630/630A tracking the current position and zone of the table 110. At 1206, the process continues by using the internal clock in the processor 632, a lookup table 704/1013 in the memory 634 of controller 630/630A, and the controller activates the motor 180 for a prescribed period of time (T) that could vary from respective zone locations to rotate the motor.

As the wind blows against the table 110 of the system 100, the table will experience some twist from its center (near the motor 180) to each end 660. The twisting from the wind will cause the ends 660 of the table to become more horizontal (with reference to zero degrees in FIG. 6). For example, if the table 110 is at forty-five (45) degrees East, and the wind is from the East, the ends 660 will likely be, for example forty-one (41) degrees East (four (4) degrees more nearly horizontal). The amount of wind speed and its direction creates a repeatable amount of TD that is be added to the lookup table 704/1013.

For example, Table 1 illustrates (for panels 190 facing into the wind) the possibilities of known TD for secondary compensation system 701 based on table 110 location and wind speed at the ends 660 for a given wind speed at X mph that are known from empirical data and added to lookup tables 704/1013 and/or by onsite instrumentation, such as inclinometers, encoders, anemometers, or any combination thereof. While Table 2 illustrates (for panels 190 facing into the wind) the possibilities of known TD for secondary compensation 701 based on table 110 location and wind speed at the ends 660 for a given wind speed at X mph that are know from empirical data and added to lookup tables 704/1013 and/or by onsite instrumentation, such as inclinometers, encoders, anemometers, or any combination thereof.

TABLE 1

Panels 190 facing into the wind

| Angle of panel (degrees) | Wind (miles per hour) | TD (degrees) |
|---|---|---|
| 60 | 0 | 0 |
| 60 | 10 | 1.0 |
| 60 | 20 | 2.0 |
| 50 | 0 | 0 |
| 50 | 10 | .6 |
| 50 | 20 | 1.2 |
| 40 | 0 | 0 |
| 40 | 10 | .2 |
| 40 | 20 | .4 |
| 30 | 0 | 0 |
| 30 | 10 | 0 |
| 30 | 20 | 0 |

TABLE 2

Panels 190 facing away from the wind

| Angle of panel (degrees) | Wind (miles per hour) | TD (degrees) |
|---|---|---|
| 60 | 0 | 0 |
| 60 | 10 | 0.8 |
| 60 | 20 | 1.6 |
| 50 | 0 | 0 |
| 50 | 10 | 0.4 |
| 50 | 20 | 0.8 |
| 40 | 0 | 0 |
| 40 | 10 | 0 |
| 40 | 20 | 0.2 |
| 30 | 0 | 0 |
| 30 | 10 | 0 |
| 30 | 20 | 0 |

It should be noted that the method of compensation based on wind speed and direction, and the method of compensation requiring overshoot and return, are independent of each other, and may be combined by linear superposition—that is, by using both methods simultaneously to determine the optimum motion of the tracker at a given time of day and while wind is at a given speed (miles per hour) and direction.

In yet another example embodiment, the tracking of the system 100 to follow the sun is improved by using instantaneous wind speed determined, for example by an anemometer at the site of the system. The use of such onsite instrumentation is provided to a tertiary compensation system 703 stored in memory 640 into look up tables 704 and/or 1013, such as the example illustrated in the process 1300 in FIG. 12.

Figure 12:
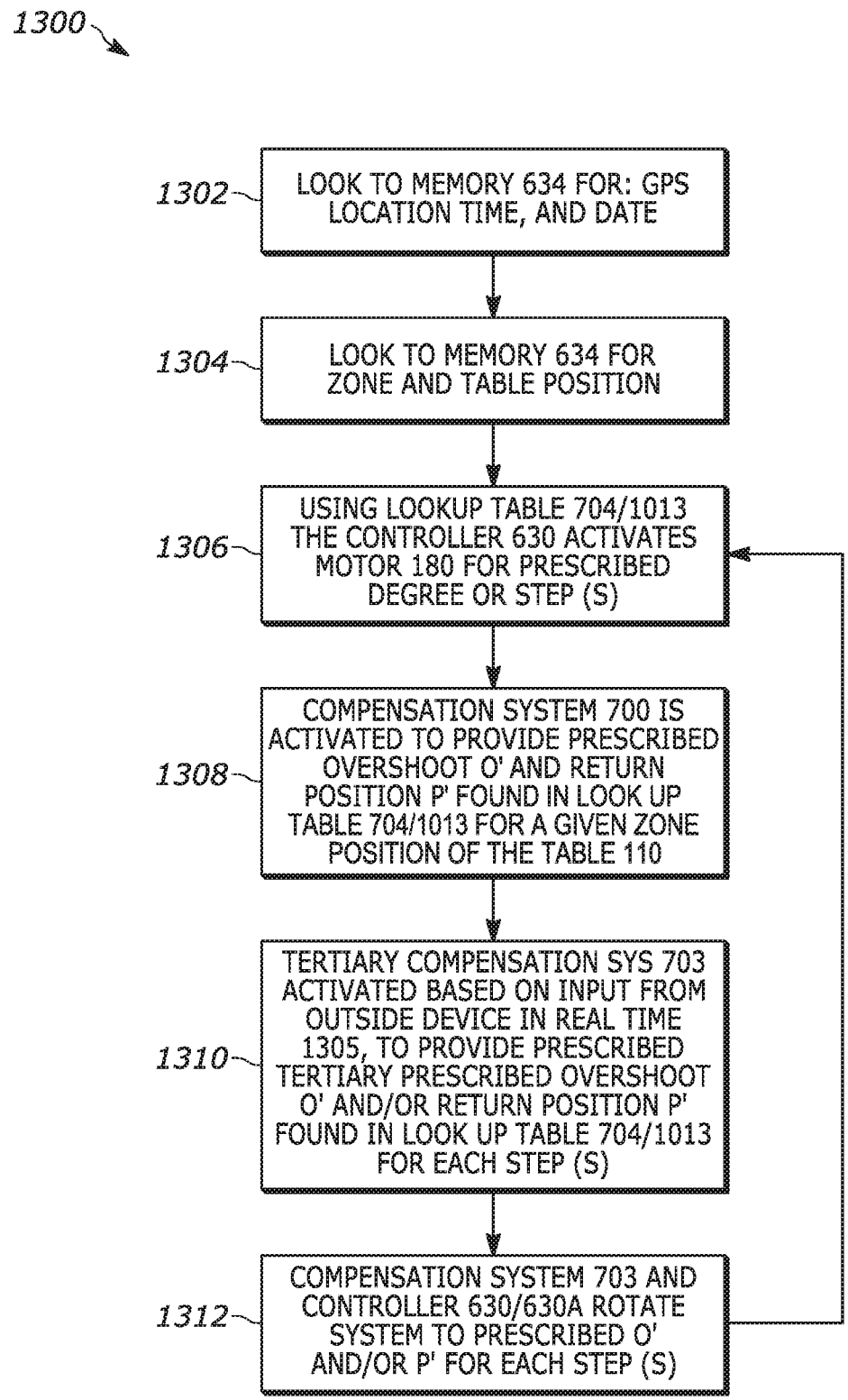
FIG. 12 is a flow chart illustrating the operation of the system in accordance with another example embodiment of the present disclosure.

Referring now to the process 1300 in the example embodiment of FIG. 12, the system 100 initiates the process 1300. At 1302, the controller 630/630A and internal processor 632 that has stored in memory 634 as to the system's latitude and longitude as well tracks (through an internal clock in the processor) the date and time. At 1304, the process 1300 continues with the controller 630/630A tracking the current position and zone of the table 110. At 1306, the process continues by using the internal clock in the processor 632, a lookup table 704/1013 in the memory 634 of controller 630/630A, and the controller activates the motor 180 for a prescribed period of time (T) that could vary from respective zone locations to rotate the motor 180.

As the wind blows against the table 110 of the system 100, the table will experience some twist from its center (near the motor 180) to each end 660. The twisting from the wind will cause the ends 660 of the table to become more horizontal (with reference to zero degrees in FIG. 6). For example, if the table 110 is at forty-five (45) degrees East, and the wind is from the East, the ends 660 will likely be, for example forty-one (41) degrees East (four (4) degrees more nearly horizontal). The amount of wind speed and its direction creates a repeatable amount of TD that is be added to the lookup table 704/1013.

At 1308, the compensation system 700 is activated to provide prescribed overshoot O' and return position P' found in look up table 704/1013 for a given zone. At 1310, the process 1300 continues and activates a tertiary compensation system 703 based on measure real time wind speed and/or panel 190 orientation to provide tertiary prescribed overshoot O' and return position P' found in look up table 704/1013 based on the additional wind and/or orientation TD from real time inputs from an anemometer 1305. At 1310, the process 1300 by way of the tertiary compensation system 703 through the controller 630/630A instructs the system 100 to rotate to a tertiary prescribed overshoot O' and/or return position P'. At the completion of step 1312, the process 1300 repeats by returning to step 1302 for the new time period and position requirements.

It is contemplated by and through the present disclosure that the compensation systems herein described, namely 700, 701, and 703 can operate jointly in the controller 630/630A by the system 100. Alternatively, each compensation systems herein described, namely 700, 701, and 703 can operate individually without the other two compensation systems or combined without the remaining compensation system.

Figure 13:
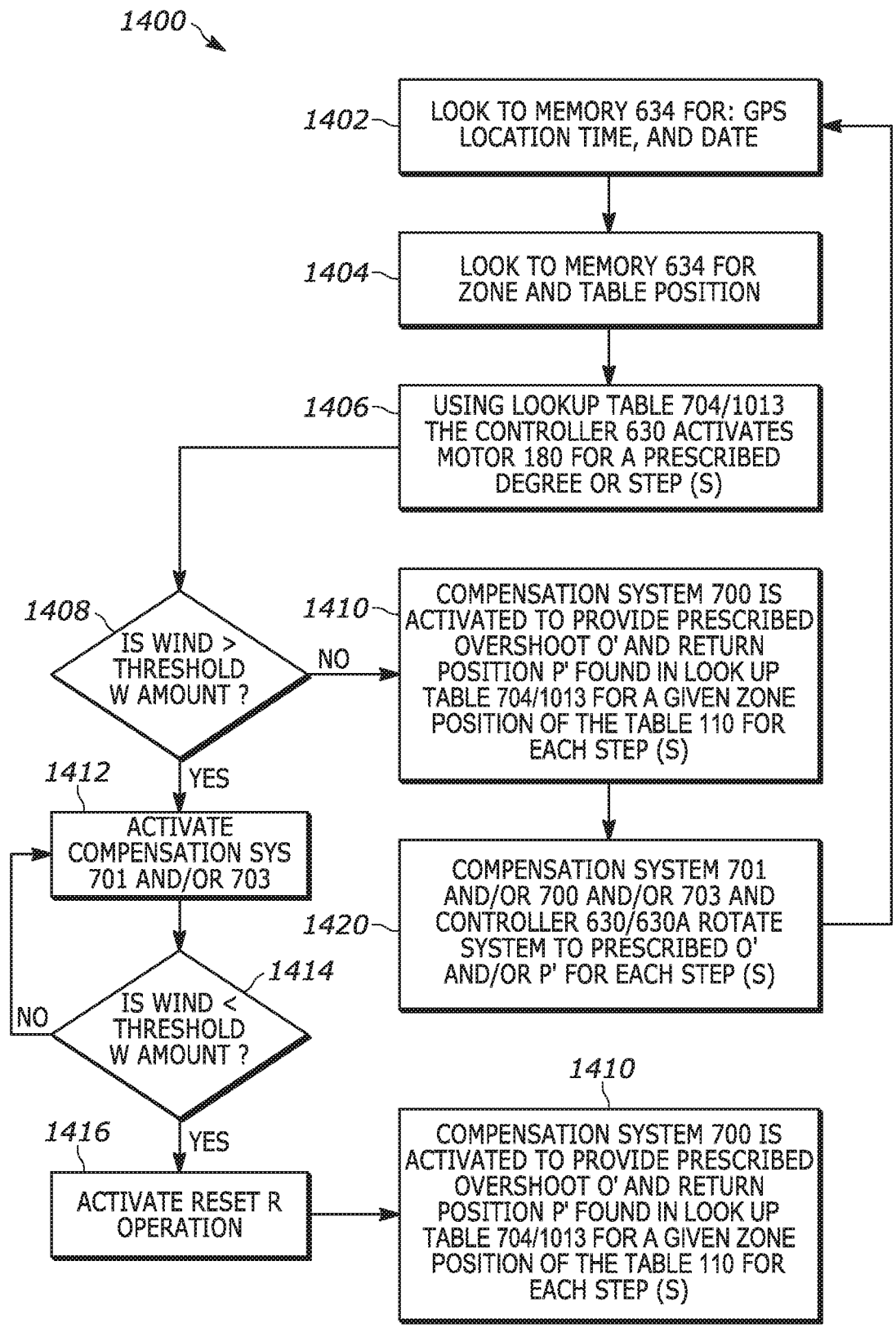
FIG. 13 is a flow chart illustrating the operation of the system in accordance with another example embodiment of the present disclosure.
Figure 14:
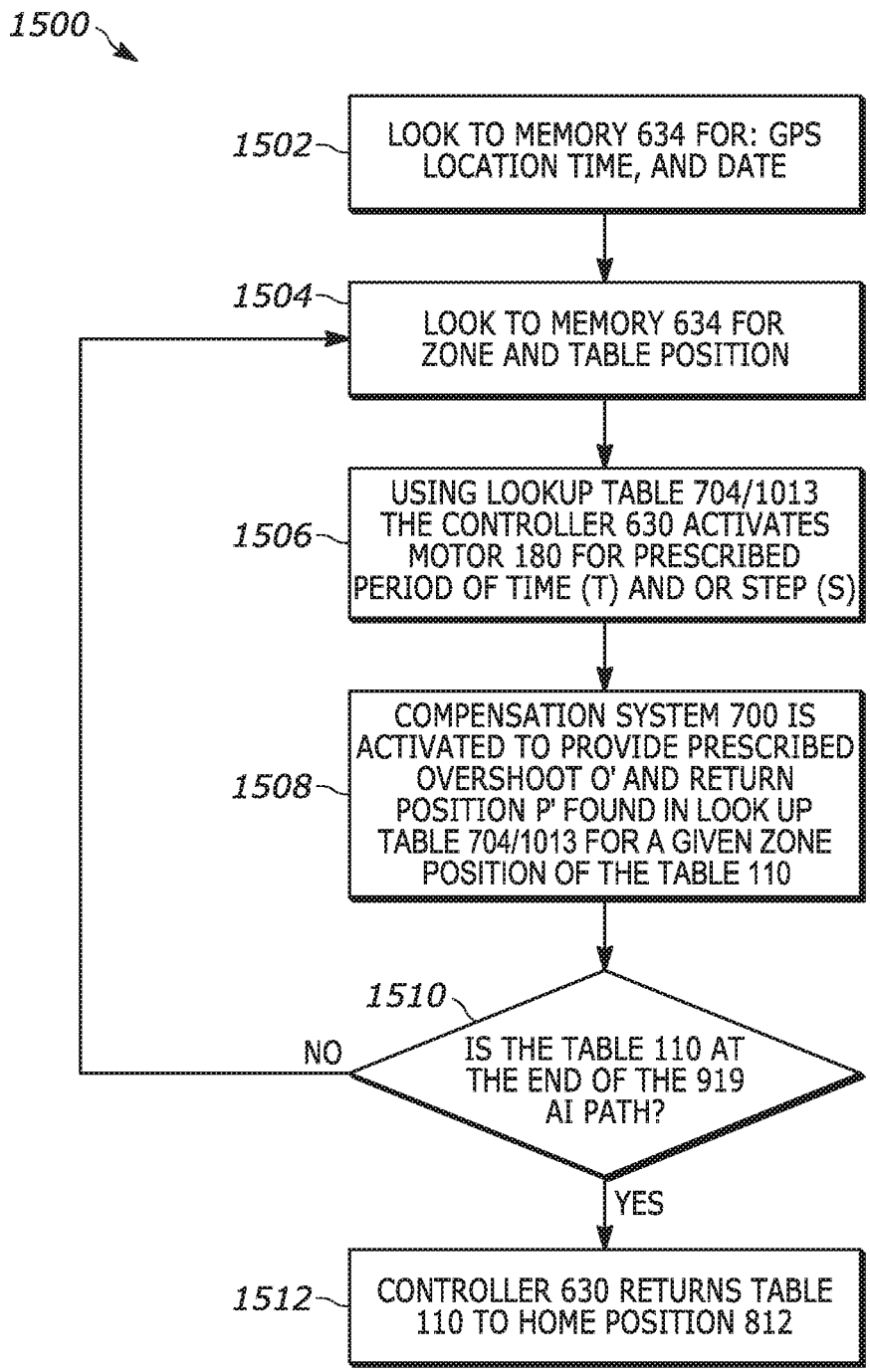
FIG. 14 is a flow chart illustrating the operation of the system in accordance with another example embodiment of the present disclosure.

In yet another example embodiment, the system 100 has experience relatively high winds, invoking processes 1200 and/or 1300 as described above to conditions in which the wind has died down significantly. In such scenarios, the system 100 performs a reboot or reset such that the beams 150 are straightened from the center to the ends 660. For example, an onsite anemometer measures wind speed, and when the wind speed drops below a prescribed threshold W, a reset R is performed on the system 100 as illustrated in process 1400 FIG. 13.

In process 1400, steps 1402-1406 operate the same as their corresponding steps, for example in process 1300. At 1408, the process 1400 determines whether or not the wind speed is greater than a prescribed wind threshold W found in a look up table 704/1013. If the determination at 1408 is a negative, the process proceeds to step 1410 and activates compensation system 700. If the determination at 1408 is an affirmative, compensation systems 701 and/or 703 are activated at 1412. At 1414 another determination is made as to whether or not the wind speed is less than a prescribed wind threshold W' found in a look up table 704/1013. If the determination at 1414 is negative, the process 1400 returns to 1412. If the determination at 1414 is an affirmative, the process activates a reset R operation at 1416 before initiating step 1410.

The reset R operation with reference to FIG. 4 at step 1416 can occur by repositioning the table 110 to a new position, for example: 1) moving the table 110 all the way to the East at a sixty-degree (60) position; moving the table 110 all the way to the West at a sixty-degree (60) position; or move the table 110 to an optimum angle at the moment for tracking (for example it may be effective to move the table just a few degrees in each direction for a reset, then to its optimum angle. The reset operation R can occur at any point in the processes 800, 900, 1000, 1100, 1200, 1300, 1400, and 1500. The reset operation can occur based on a trigger from the controller 630. The trigger can occur from a remote signal, a detected condition (such as snow, ice, or wind), or any combination thereof.

Figure 15:
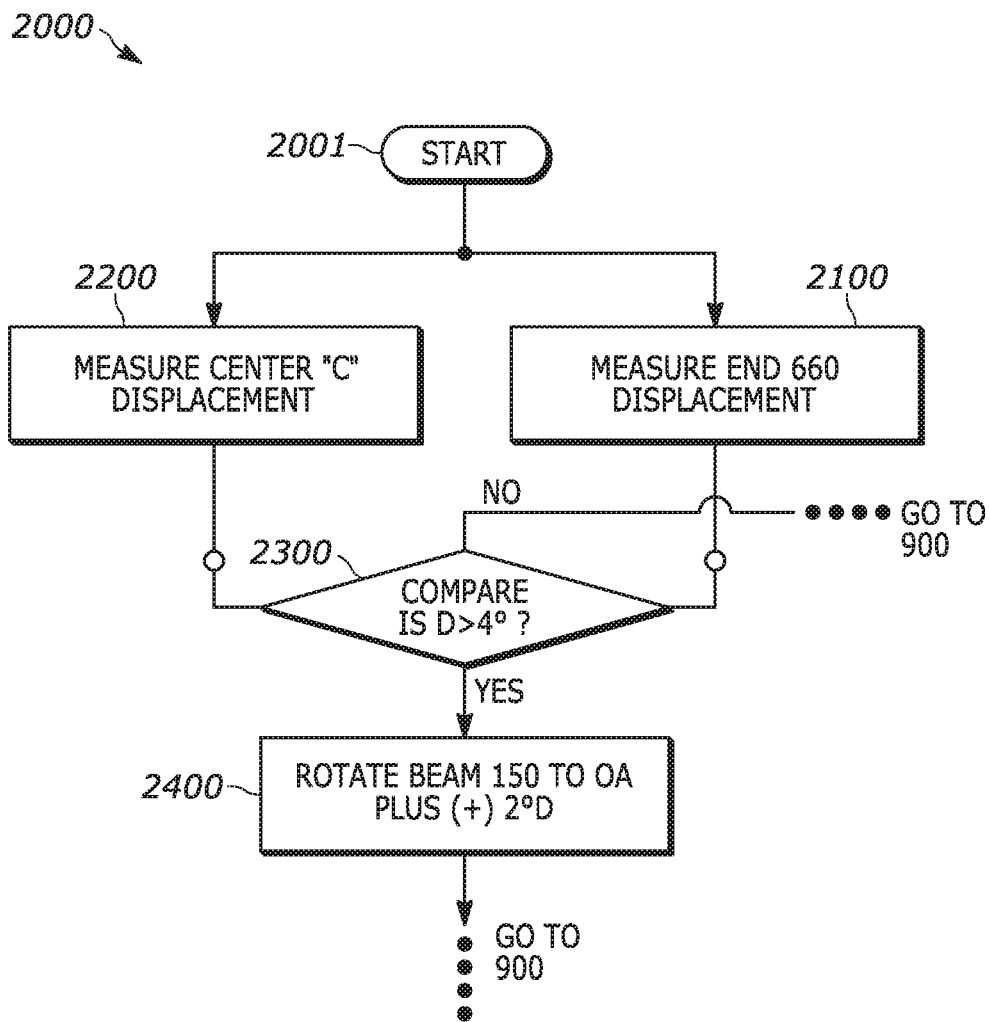
FIG. 15 is a flow chart illustrating the operation of the system in accordance with another example embodiment.

In another example embodiment, controller 630 of the tracking system 2000 divides the angle in the prescribed overshoot O' when a displaced condition 2000 (see FIG. 15) is inferred 2300 between the ends 660 and center C positions. There are a number of reasons why the angle of the modules 190 and table 110 at the end of the beam 150 are different from the module angle at the middle of the system 700 (at the center "C" position between portions 152, 154 see FIG. 1). On reason might be that the modules are unbalanced, that is, the center C of the mass of the moving table 110 is above or below the axis of rotation, causing the weight of the moving table to push the modules 190 toward a horizontal position or vertical position. If the table 110 is unbalanced, the ends 660 will be biased toward the vertical toward the horizontal, causing the beam 150 and modules 190 to twist from the center C.

In one example embodiment, the dividing of the system 2000 includes a method of moving a tracker 110, when wind speed and direction is measured by an anemometer or other device, such that twist in the tracker, from its center to either or both of its ends, caused by the speed and direction of the wind, can be compensated to some degree, by positioning the center of the tracker at an angle different from the angle normal to the incident sun, such that the ends of the tracker are more nearly normal to the sun, and the greatest angle between the incident sunlight and any module is minimized. For example, if the incident sunlight is at 45 degrees, and if the wind is from the west at 20 miles per hour, and if experimentation has shown that wind at that speed and direction creates a twist of 4 degrees from the center of the tracker to each end 660, toward the horizontal, so that the ends will be at 41 degrees, which is 4 degrees from normal to the incident sunlight. At such position, the center of the tracker 110 can be put at 47 degrees, so the ends 660 will be at 43 degrees, and no module 190 will be at an angle more than 2 degrees from normal to the incident sunlight.

Another reason the modules 190 and table 110 may be twisted at the ends 660 is that wind may blow steadily, yet hard enough to cause the ends to be a different angle from the angle of the center C of the tracker 100/700/900/2000. As an example, the center C of the tracker 100/700/900/2000 might be set at 50 degrees, facing West, but due to wind and/or imbalance, the ends might be at 46 degrees. In such situation, the controller 630 divides the system 100/700/900/2000 to rotate the panels to 52 degrees when the optimum angle "OA" for the modules 190 receiving energy from the sun is 50, so that the ends 660 will be at 48 degrees. Thus, the average on the controller 630 divide of the table 110 averages 50 degrees plus-or-minus two (2) degrees 2400. Stated another way, the controller 630 upon inferring a displaced condition 2000 will increase the prescribed rotation of the beam 150 and table 110 to the optimum angle OA plus a delta displacement amount D. In the above example embodiment, the delta displacement amount D is two (2) degrees. An inferring a displaced condition can also be initiated by the controller 630 based on empirical data, historical data, based one time, months or seasons of the year, combinations thereof, and the like.

Because the energy lost when a table 110 is not aimed correctly is proportional to one (1) minus the cosine of in the incident sun angle, maintaining the controller 630 divide and incident angle (as discussed in the proceeding paragraph) at equal or less than two (2) degrees keeps the energy loss to the table 110 and system 100/700/900/2000 to be less than 0.06%. Without the controller 630 divide, some of the modules 190 in the above example would be at four (4) degrees from the OA and the energy loss would be approximately 0.24%. Thus, the energy loss can be optimized when the OA is offset two (2) degrees of the modules 190 to the West at the ends 660 and two (2) degrees of the modules 190 to the East at the center C by the controller divide 630, rather than having some of the modules four (4) degrees from optimum in either direction.

In one example embodiment, the controller 630 initiating an inferring a displaced condition 2000 can occur from a signal or signals provided from one or more sensors, such as inclinometers, encoders, anemometers, or any combination thereof. Alternatively, the detecting of a displaced condition 2000 can occur from empirical data or information known based on time, date, and/or third-party information.

In the foregoing specification, specific embodiments have been described. However, one of ordinary skill in the art appreciates that various modifications and changes can be made without departing from the scope of the disclosure as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed. Any document referenced herein is incorporated by reference in its entirety and for all purposes.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A solar tracking system comprising:
a pivoting table driven for rotation about an axis of rotation through a rotational angle range, the pivoting table including at least one longitudinally extending beam and a plurality of photovoltaic modules supported by and pivoting with the beam;
an actuator coupled to the beam for rotating the pivoting table about the axis of rotation through the rotational angle range; and
a controller for activating said actuator to control rotational angular position of the table to at least one first and second prescribed rotations during operation of the solar tracker system to optimize the receipt of the sun's radiation onto said photovoltaic modules, such that said first prescribed rotation is at a first location rotated in a first direction beyond a targeted angle of incidence to the pivoting table and said second prescribed rotation is at a second location rotated in a second direction opposite said first direction.

2. The solar tracking system of claim 1 wherein said first rotation is an overshoot rotation and said second rotation is an angular return position, such that said angular rotation of said overshoot rotation is greater than said angular return position throughout said rotational angle range.

3. The solar tracking system of claim 1 wherein said actuator includes a gear assembly.

4. The solar tracking system of claim 1 wherein said actuator is one of a linear actuator and a mechanical actuator.

5. The solar tracking system of claim 1 wherein said beam is a plurality of beams coupled at an end or ends of the respective beams to form a single linear beam.

6. The solar tracking system of claim 1 wherein said targeted angle of incidence is an angle in which the sun's angle of incidence is substantially normal to the planar surfaces of said plurality of photovoltaic modules.

7. The solar tracking system of claim 1 wherein said targeted angle of incidence is an angle in which the sun's angle of incidence is normal to the planar surface more of than half of said plurality of photovoltaic modules.

8. The solar tracking system of claim 1 wherein said targeted angle of incidence is an angle in which the planar surface of more than half plurality of photovoltaic modules are at angle to maximize solar collection from the sun.

9. The solar tracking system of claim 1 wherein said controller activates said rotation of said table from said first prescribed location to said second prescribe location a plurality of times in said table's path of travel between said tracking system's home position and an end position.

10. A method of controlling an angle of inclination of a pivoting table of a solar tracker system, the method comprising the steps of:
rotating a table driven about an axis of rotation through a rotational angle range, the pivoting table having a longitudinally extending beam and a plurality of photovoltaic modules supported by and pivoting with the beam;
providing an actuator coupled to the beam for rotating the pivoting table about the axis of rotation through the rotational angle range; and
activating said actuator with a controller to control rotational angular position of the table to at least one prescribed overshoot rotation and at least one prescribed angular return rotation during operation of the solar tracker system.

11. The method of claim 10 wherein said step of activating said actuator to perform at least one prescribed overshoot rotation is at an angle beyond a targeted angle of incidence to the pivoting table and said prescribed angular rotation is at an angle rotated in a direction opposite said direction of said prescribed overshoot rotation.

12. The method of claim 11 wherein said overshoot rotation and said angular return rotation are calculated such that said angular rotation of said overshoot rotation is greater than said angular return rotation throughout said rotational angle range.

13. The method of claim 10 wherein said step of activating said actuator with a controller to control rotational angular position of the table to at least one prescribed overshoot rotation and at least one prescribed angular return rotation during operation of the solar tracker system is such that said prescribed angular return rotation terminates at a targeted angle of incidence that is an angle in which the sun's angle of incidence is substantially normal to the planar surfaces of said plurality of photovoltaic modules.

14. The method of claim 10 wherein said step of activating said actuator with a controller to control rotational angular position of the table to at least one prescribed overshoot rotation and at least one prescribed angular return rotation during operation of the solar tracker system is such that said prescribed angular return rotation terminates at a targeted angle of incidence that is an angle in which the sun's angle of incidence is normal to the planar surface more of than half of said plurality of photovoltaic modules.

15. The method of claim 10 wherein said step of activating said actuator with a controller to control rotational angular position of the table to at least one prescribed overshoot rotation and at least one prescribed angular return rotation during operation of the solar tracker system is such that said prescribed angular return rotation terminates at a targeted angle of incidence that is an angle in which the planar surface of more than half plurality of photovoltaic modules are at angle to maximize solar collection from the sun.

16. A solar tracking system comprising:
- a pivoting table driven for rotation about an axis of rotation through a rotational angle range, the pivoting table including a longitudinally extending beam and a plurality of photovoltaic modules supported by and pivoting with the beam;
- an actuator coupled to the beam for rotating the pivoting table about the axis of rotation through the rotational angle range; and
- a controller for activating said actuator to control rotational angular position of the table to at least a prescribed rotation during operation when said controller infers a displaced condition of the solar tracker system to optimize the receipt of the sun's radiation onto said photovoltaic modules, such that said first prescribed rotation is at a first location rotated in a first direction at targeted angle of incidence plus a delta displacement angle.

17. The solar tracking system of claim 16 wherein said targeted angle of incidence is an angle in which the sun's angle of incidence is substantially normal to the planar surfaces of said plurality of photovoltaic modules.

18. The solar tracking system of claim 16 wherein said targeted angle of incidence is an angle at which the sun's angle of incidence is within plus/minus two-degrees to the planar surface of more of than half of said plurality of photovoltaic modules.

19. The solar tracking system of claim 16 wherein said targeted angle of incidence is an angle in which the planar surface of more than half plurality of photovoltaic modules are at angle to maximize solar collection from the sun.

20. The solar tracking system of claim 16 wherein said actuator includes a gear assembly.

* * * * *